United States Patent [19]
Ramachandran et al.

[11] Patent Number: 5,978,850
[45] Date of Patent: Nov. 2, 1999

[54] SYSTEM AND METHOD FOR ACCESSING PARAMETERS IN A FIELDBUS NETWORK USING A TAG PARAMETERS INTERFACE

[75] Inventors: Ram Ramachandran; Donald B. Goff, both of Austin; Sherwin Su, Cedar Park, all of Tex.

[73] Assignee: National Instruments Corporation, Austin, Tex.

[21] Appl. No.: 08/886,909

[22] Filed: Jul. 2, 1997

[51] Int. Cl.⁶ ..................................................... G06F 13/00
[52] U.S. Cl. ........................... 709/228; 709/223; 709/253
[58] Field of Search ................................... 709/223, 224, 709/225, 227, 228, 229, 230, 253, 300, 302, 201, 202, 203; 364/138, 146, 188

[56] References Cited

U.S. PATENT DOCUMENTS

| | | | |
|---|---|---|---|
| 5,442,639 | 8/1995 | Crowder et al. | 371/20.1 |
| 5,796,602 | 8/1998 | Wellan et al. | 364/130 |
| 5,841,654 | 11/1998 | Verissimo et al. | 364/188 |

OTHER PUBLICATIONS

Fieldbus Foundation Fieldbus Specification System Architecture, By Fieldbus Foundation, Aug. 28, 1995, pp.

*Primary Examiner*—Viet D. Vu
*Attorney, Agent, or Firm*—Conley, Rose & Tayon; Jeffrey C. Hood

[57] ABSTRACT

A system and method for accessing parameters or objects using a tag parameter interface in a fieldbus system. The present invention enables access to parameters or objects using the tag parameter construct without requiring the user to perform any pre-configuration of connections or name to index mappings. This considerably simplifies user development of applications in a fieldbus network, wherein the user is completely shielded from all Fieldbus Foundation protocol details. According to the present invention, the user is not required to have any knowledge about the details of the VCR, how to set up or establish the VCR, or even that an entity called "VCR" exists in the system. Also, the present invention automatically maps the parameter name to an index, and thus the user is shielded from the details of construction of the device. Also, if a new function block is instantiated or an existing function block is de-instantiated, the method of the present invention handles the configuration management without requiring any user involvement.

43 Claims, 21 Drawing Sheets

Fieldbus Network Devices

| DL Mapping Attribute | VCR Type | | |
|---|---|---|---|
| | Publisher/Subscriber | Report Distribution | Client/Server |
| Queue/Buffer | Buffer | Queue | Queue |
| Cyclic/Acyclic | Either | Acyclic | Acyclic |
| Unidirectional/Bidirectional | Unidirectional | Unidirectional | Bidirectional |
| Connection-oriented/Connectionless | Connection-oriented | Connectionless | Connection-oriented |

FIG. 1
(PRIOR ART)

| VCR Endpoint Type | AP Use of VCR | DLL Mode of Operation | VCR Endpoint Role | VCR Endpoint DLL Address Type[5] |
|---|---|---|---|---|
| BNU[1] | Publishing of Data | Connection-oriented | Publisher | Connection Endpoint (DLCEP) |
|  |  |  | Subscriber | No Address[5] |
| QUB[2] | Request/Response | Connection-oriented | Client | DLCEP |
|  |  |  | Server | DLCEP |
| QUU[3] | Report Distribution | Connectionless | Source | Individual Service Access Point (DLSAP) |
|  |  |  | Sink | Group DLSAP |
| None[4] | SMK Access via SMKP | Connectionless | SMK Access | Reserved Individual DLSAP |

NOTES: 
1. BNU = Buffered, Network scheduled, Unidirectional broadcast
2. QUB = Queued, Unscheduled, Bidirectional peer-to-peer
3. QUU = Queued, Unscheduled, Unidirectional multicast
4. VCR Not Used for Access to SMKP via SMKP. SMKP accesses data link layer directly.
5. Subscribers listen for messages sent from their corresponding publisher's DLCEP address, instead of listening for messages addressed to a group.

FIG. 3
(PRIOR ART)

| FMS Object | Service | Service Type | Meaning | VCR Endpoint Type |
|---|---|---|---|---|
| VCR Endpoint | Initiate | Confirmed | Establish a connection | All |
| | Abort | Unconfirmed | Release a connection | All |
| VFD | Status | Unconfirmed | Read a device/user status | Not assigned |
| | UnsolicitedStatus | Unconfirmed | Report an unsolicited status | Not assigned |
| | Identify | Confirmed | Read vendor, type and version | Client/Server |
| | Reject | Unconfirmed | FMS reject of an improper confirmed service | Client/Server |
| OD | GetOD | Confirmed | Read an Object Description | Client/Server |
| | InitiatePutOD | Confirmed | Start an OD Load | Client/Server |
| | PutOD | Confirmed | Load an Object Description | Client/Server |
| | TerminatePutOD | Confirmed | Stop an OD Load | Client/Server |
| Domain | GenericInitiateDownload Sequence | Confirmed | Open a Download sequence | Client/Server |
| | GenericDownloadSegment | Confirmed | Transmit a Download Data block | Client/Server |
| | GenericTerminateDownload Sequence | Confirmed | Stop a Download sequence | Client/Server |
| | InitiateDownloadSequence | Confirmed | Open a Download sequence | Client/Server |
| | DownloadSegment | Confirmed | Transmit a Download Data block | Client/Server |
| | TerminateDownloadSequence | Confirmed | Stop a Download sequence | Client/Server |
| | RequestDomainDownload | Confirmed | Request a Download | Client/Server |
| | InitiateUploadSequence | Confirmed | Open an Upload sequence | Client/Server |
| | UploadSegment | Confirmed | Transmit an Upload sequence | Client/Server |
| | TerminateUploadSequence | Confirmed | Stop an Upload sequence | Client/Server |
| | RequestDomainUpload | Confirmed | Request an Upload | Client/Server |
| ProgramInvocation | CreateProgramInvocation | Confirmed | Create a program | Client/Server |
| | DeleteProgramInvocation | Confirmed | Delete a program | Client/Server |
| | Start | Confirmed | Start a program | Client/Server |
| | Stop | Confirmed | Stop a program | Client/Server |
| | Resume | Confirmed | Resume a program - after Stop | Client/Server |
| | Reset | Confirmed | Reset program | Client/Server |
| | Kill | Confirmed | Kill a program | Client/Server |
| Variable Variable List | Read | Confirmed | Read a variable | Client/Server |
| | Write | Confirmed | Write a variable | Client/Server |
| | ReadWithType | Confirmed | Read a variable with Type | Client/Server |
| | WriteWithType | Confirmed | Write a variable with Type | Client/Server |
| | PhysRead | Confirmed | Read a memory location | Client/Server |
| | PhysWrite | Confirmed | Write a memory location | Client/Server |
| | InformationReport | Unconfirmed | Send Data | Publisher/Subscriber |
| | InformationReportWithType | Unconfirmed | Send Data with Type | Client/Server |
| | DefineVariableList | Confirmed | Define a Variable List | Client/Server |
| | DeleteVariableList | Confirmed | Delete a Variable List | Client/Server |
| Event | EventNotification | Unconfirmed | Report an event | Report Distribution |
| | EventNotificationWithType | Unconfirmed | Report an event with Type | Report Distribution |
| | AcknowledgeEventNotification | Confirmed | Acknowledge an event | Client/Server |
| | AlterEventConditionMonitoring | Confirmed | Disable/Enable an event | Client/Server |

FIG. 5
(PRIOR ART)

|  | VCR Type | | |
|---|---|---|---|
| Endpoint Characteristic | Publisher/Subscriber | Report Distribution | Client/Server |
| Endpoint Roles per VCR | Multiple endpoints permitted: 1 Publisher (sender) N Subscriber (receiver) | Multiple endpoints permitted: 1 Source (sender) N Sinks (receiver) | 2 endpoints permitted: 1 Client or 1 Peer (1) 1 Server or 1 Peer (1) |
| Free Endpoint Support (2) | No | Yes | Yes |
| FAS Services: | | | |
| Associate | X(3) | X(4) | X(5) |
| Abort | X | X | X |
| Data Transfer Confirmed | X | | X |
| Data Transfer Unconfirmed | X | X | |
| FAS Compel | X | | |
| Get Buffered Message | X | | |
| FAS-Status | | | |
| DL Mapping Attributes | | | |
| Queue/Buffer | Buffer | Queue | Queue |
| Cyclic/Acyclic | Either | Acyclic | Acyclic |
| Unidirectional/Bidirectional | Unidirectional | Unidirectional | Bidirectional |
| Mode of Operation | Connection-oriented | Connectionless | Connection-oriented |
| Duplicate Detection | Optional(6) | No | Yes(5) |
| Timeliness | Optional | No | No |
| DL-Address Type | Publisher: Individual DLCEP Subscriber: No address | Source: Individual DLSAP Sink: Individual or Group DLSAP | Client: Individual DLCEP Server: Individual DLCEP |

NOTES: 1. When an endpoint operates as a DL-PDU NOR an FAS PDU to be transferred.
       2. Free endpoints are those in which the remote endpoint is dynamically defined when the VCR is opened. VCR endpoints may also be preconfigured with the remote endpoint defined.
       3. Causes a DL-PDU to be transferred, but not an FAS PDU.
       4. Causes NEITHER a DL-PDU NOR an FAS PDU to be transferred.
       5. Causes BOTH a DL-PDU and an FAS PDU to be transferred. The DLPDU is sent to a standardized DLSAP for VCR establishment. The FAS Associate PDU contains the 2 DLCEP address to be used for the VCR.
       6. Duplicate detection for Publisher/Subscriber VCRs means that the VCR user is notified when the previously received message was received again into the buffer. For Client/Server, it means that the protocol does not deliver duplicates.

FIG. 6
(PRIOR ART)

Fieldbus Network Link

Fieldbus Network Devices

Function Block Linkages

Key Components of the Function Block Application Architecture

Function Block Parameters

Block Internal Structure and Execution

Block Composite Object

FIG. 20 QUU Connection Management

BNU Connection Management

Flowchart for Block Parameter Access by Name

Flowchart for Other Object Access by Name

SYSTEM AND METHOD FOR ACCESSING PARAMETERS IN A FIELDBUS NETWORK USING A TAG PARAMETERS INTERFACE

FIELD OF INVENTION

The invention relates to fieldbus networks. In particular, the invention relates to an improved fieldbus API which performs connection management and name to index conversion, thus allowing users to access parameters using a tag parameter interface.

BACKGROUND OF THE INVENTION

A fieldbus is a specific type of local area network (LAN) that is used to monitor or control one or more pieces of production equipment. The term "Fieldbus" generally refers to an all-digital, two-way communication system that connects control systems to instrumentation. A fieldbus network comprises a plurality of digital devices and control/monitoring equipment that are integrated to provide I/O and control for automated processes. A fieldbus network is typically used in industrial and/or process control applications, such as a factory or manufacturing plant. The physical devices in a fieldbus system are connected by the fieldbus. One example of a fieldbus network is the Fieldbus Foundation fieldbus network.

Foundation Fieldbus, which is the serial communications network created by the Fieldbus foundation, specifically targets the need for robust distributed control in process control environments. Devices connected by a Foundation Fieldbus exchange data between themselves, and thus control a fieldbus process. Devices are given the opportunity to communicate data by a token passing scheme controlled by a device referred to as the "Link Active Scheduler" or LAS (a device used to schedule communication traffic).

The components of a Foundation Fieldbus Network include the following:

1) Link
2) Devices
4) Linkages
5) Loops
6) Schedule

Fieldbus networks may contain one of four types of devices, these being temporary devices, field devices, interface devices, and monitor devices. Temporary devices are devices attached to one of four network addresses reserved for temporary or visitor use. Temporary devices are typically used for configuration and troubleshooting. Field devices are devices that typically comprise function block application processes or, in other words, devices that perform the I/O and control that automates the plant or factory. All field devices are given a permanent address by the system manager when they are attached to the network. Interface devices perform data display and other interface functions for field devices. Like field devices, interface devices are assigned a permanent address, but interface devices do not necessarily contain function block application processes. Finally, monitor devices are devices that are able to listen to network traffic but are not permitted to transmit onto the network. Monitor devices receive no address when attached to the network, and the other network devices are unaware of the monitor's presence.

A field device generally comprises one or more different types of blocks, including function blocks, resource blocks, and transducer blocks. A function block comprises an algorithm and one or more parameters associated with the algorithm. Function blocks model field device functions, such as analog input (AI) functions and PAID (Proportional Integral Derivative) control loop functions, among others. The function block model provides a common structure for defining function block inputs, outputs, algorithms and control parameters. This structure simplifies the identification and standardization of characteristics that are common to function blocks. A collection of one or more function blocks is referred to as a virtual field device (VFD).

A resource block makes visible hardware specific characteristics associated with function block application processes. Resource blocks include a set of contained parameters to represent these characteristics. Resource blocks also include an algorithm that is used to monitor and control the general operation of the physical device hardware.

A transducer block operates to control access to I/O devices through a device independent interface defined for use by function blocks. Transducer blocks insulate function blocks from the specifics of I/O devices, such as sensors, actuators, and switches. Transducer blocks also perform functions, such as calibration and linearization, on I/O data to convert it to a device independent representation The function block model includes associated standardized definitions used to support function blocks. These definitions include the Object Dictionary (OD) and the Device Description Language (DDL). These definitions support application processes in the definitions and description of their network visible objects, such as function blocks and their parameters.

Each physical device performs a portion of the total system operation by implementing one or more application processes. Application processes perform one or more time-critical functions, such as providing sensor readings or implementing one or more control algorithms. As noted above, these field device functions are modeled by function blocks. The operation of the various function blocks is coordinated through configuration of their external communications, execution schedules, and operating parameters.

Physical devices in a fieldbus system are interconnected by a fieldbus network. Fieldbus networks may be comprised of one or more link segments interconnected by bridges. Communication between physical devices is provided by physical layer and data link layer protocols. Intervening bridges forward messages transparently between links.

A fieldbus network utilizes a four layered communication stack or four layer protocol, including a physical layer, a data link layer, and application layer that is divided into an access sublayer and a messaging sublayer. Transfer of information between field devices is provided by the physical layer and data link layer protocols. The physical layer specifies how signals are sent, the fieldbus data link layer (FDL) specifies how the network access is shared and scheduled among devices, and the application layer defines the message formats available to applications for the exchange of commands. Communications between application processes in the field devices occurs through the application layer protocols. The application layer is divided into two sublayers, an upper sublayer, defamed by the Fieldbus Messaging Specification (FMS), that provides services to application processes, and a lower sublayer, known as the Fieldbus Access Sublayer (FAS), that maps FMS services onto the underlying capabilities of the data link layer.

In fieldbus networks, information is transmitted along the fieldbus in discrete segments commonly referred to as packets. Packets are passed between the field devices connected to the network. Each packet may contain FDL information, FAS information, and FMS information corresponding to the various architectural layers used in the fieldbus implementation.

System management is used in fieldbus networks to coordinate the operation of the various devices in a distributed fieldbus system. System management functions include node address assignment for devices, application clock synchronization, distributed application scheduling across the segment, and support for locating application tags. System management provides the facilities to bring new devices on the segment to an operational state and to control the overall system operation. System management uses FMS to remotely access management information within a device and to directly access the data link layer to carry out its other functions. A single system management entity exists in each device for each data link segment connected to the device. The entity comprises user applications and a system management kernel. The kernel provides a network coordinated and synchronized set of functions.

In order to program a fieldbus network for a certain application, a fieldbus configuration is created and downloaded to the network. A fieldbus application or configuration specifies communication between two or more blocks, such as function blocks. A fieldbus application or configuration also includes accesses, i.e., reads or writes, to various parameters in function blocks. Thus, a fieldbus application or configuration is generally required to access, i.e., read or write, parameters or objects in various blocks.

Background on Parameter Accesses in a Fieldbus Network

In the Foundation Fieldbus protocol, each parameter has an index or numeric identifier which uniquely identifies the parameter. Thus, in the Foundation Fieldbus protocol, in order to access parameters in Fieldbus devices, a host system must supply a numeric identifier called an index in the Fieldbus message. The numeric identifier, however, is not meaningful to a human. A parameter name, in the form of a text string, is also available for each parameter. However, this text string can not be sent in the Fieldbus message to directly access the parameter. Thus the user is required to use non-mnemonic identifiers or indexes, instead of the parameter name, when accessing parameters.

Therefore, an improved system and method is desired for enabling a user or developer to more easily access parameters in a fieldbus system.

Background on Communications in a Fieldbus Network

Network Communications

To support the transfer of information between devices, the Fieldbus Foundation system Architecture defines a three layer communications architecture. This architecture contains a physical layer that specifies how signals are sent, a data link layer that specifies how the network is shared and scheduled among devices, and an application layer that defines the message formats available to applications for the exchange of commands and responses, data, and event messages.

The application layer is divided into two sublayers, an upper layer that supplies application layer services to APs, and a lower Fieldbus Access Sublayer (FAS) that provides different models of interaction by mapping these services onto different capabilities of the underlying data link layer.

Application Layer Services

Application Layer services in the Fieldbus Foundation are defined by Fieldbus Messaging Specification (FMS). FMS specifies services and message formats for accessing AP objects as well as the OD descriptions for those objects. FMS, in combination with OD descriptions, specify the functional interface for field device applications.

FMS messages are transferred between devices over application layer communications channels called Virtual Communication Relationships (VCRs). A VCR represents a binding between two or more Aps, with a single context shared by FMS, FAS, and the Data Link Layer. Different types of VCRs are defined to support three different models of AP interaction: data publisher/subscriber, report distribution, and client/server requests and responses. FMS provides the services to APs to open and close its VCRs, but is itself unaware of the model of interaction. The FMS layer, instead, relies on the Fieldbus Access Sublayer to select and manage the specific characteristics of a particular type of VCR.

Fieldbus Access Sublayer

The Fieldbus Access Sublayer defines and provides the three types of VCRs. Each type is defined by packaging a specific set of data link layer capabilities together to support a particular model of AP interaction.

FAS maintains a set of data link mapping attributes that specify the data link support for the VCR type. These attributes indicate whether the VCR is queued or buffered, cyclic or acyclic, unidirectional or bidirectional, and connection-oriented or connectionless. If buffered, the attribute indicates whether timeliness is to be supported. These attributes also include the data link addresses necessary to convey messages between FAS entities. A summary of the VCR types and their mapping to the data layer is shown in FIG. 1.

Fieldbus Data Link Layer

The fieldbus data link layer is a subset of that defined by the IEC. The subset was used to support the VCR types defined by FAS. Queued VCR types permit applications to transfer messages to each other using a FIFO (first in-first out) queue maintained within the data link layer.

Buffered VCR types, on the other hand, permit applications to transfer messages to each other using buffers in sending and receiving data link layer entities. Buffered transfers are specified such that:

1) sending a new message overwrites the old message in the buffer, and 2) reading from the buffer does not destroy its contents.

Cyclic VCR types have their messages transferred according to a data link layer schedule maintained and enforced by a special device on each link segment known as the Link Active Scheduler (LAS). Within the Fieldbus Foundation subset, only publisher/subscriber data can be transmitted cyclically. The LAS uses the schedule and indicates when the data is to be transmitted. Subscribers of the data listen for the publisher's address to know whether they are to receive the data.

To publish data through a bridge, the bridge and the LAS on the bridge's outbound link must be configured to republish the data. The LAS on the inbound link triggers the publisher to transmit the data. The bridge receives the data, and if configured for republishing, buffers the data for transmission on its outbound link. The bridge then waits for the LAS on its outbound link to instruct it to transmit the data.

When the LAS has nothing scheduled, it gives the devices on its link the right to transmit acyclic, or unscheduled data. Report distribution and client/server exchanges are transferred during unscheduled periods, according to their priority. In special cases, it is possible to define an acyclic publisher/subscriber VCR. In these cases, the data to be published is only sent when the data is compelled from the buffer by the publisher or the subscriber. The compel is a special service provided by the data link layer to allow a local or remote DLL user to request an acyclic transfer of data.

To forward acyclic data through a bridge, only the bridge has to be configured for forwarding. When a bridge receives acyclic data for forwarding, it queues the data on its outbound link. When receiving the right to transmit, the bridge transmits from its queue in the first-in-first-out (FIFO) priority order. In this case, the bridge only needs to know which addresses it will forward.

Unidirectional VCR types are used to transfer unconfirmed services to one or more recipients. They are used to support the transfer of published data and for the distribution of event messages. Bidirectional VCR types are used to transfer confirmed service requests and response between two APs. Only the client/server VCR type is bidirectional.

Connection-oriented VCR use data link connections. These connections must be established before data can be sent. However, after they are established, only a single address is required to accompany transmitted data. In the case of publisher/subscriber VCR, the address of the publisher is used. For client/server VCR, the address of the destination endpoint is used.

Connection-less VCR do not use data link connections. Instead, their data is transferred using a single connectionless transfer service. No setup is required in this case. However, both the source and destination address accompanies the data. This type of transfer is used for event message distribution, because it permits the senders of event messages to group addresses. Receivers, then can listen to all messages transmitted to a single group, regardless of who the sender is. If a publisher/subscriber had been used instead, each receiver would have to listen to a set of addresses, one for each event message source.

Fieldbus Physical Layer

The Fieldbus physical layer is composed of the physical medium and signaling protocol used to transmit data. Three types of media are defined, twisted wire pair, optical fiber, and radio. When the twisted wire pair medium is used, two power options are defined, a bus powered option in which devices draw their power directly from the bus. This option provides the ability to implement low power devices for use in intrinsically safe environments. The second power option is referred to as self-powered, or also line-powered. Self powered devices draw their power from an external force, and not from the bus.

Three transmission speeds may be used in fieldbus networks, 31.25 kbps, 1 Mbps, and 2.5 Mbps. The 31.25 kbps speed has been specified to support intrinsically safe environments.

Device Architecture

The fieldbus device architecture specifies the internal structure of fieldbus devices as seen from an inter operability perspective. This section specifies the device architecture along with a basic set of fieldbus device types used within the Fieldbus Foundation system architecture.

Overview

FIG. 2 illustrates the Fieldbus Foundation Device Architecture. The fieldbus device architecture describes the internal structure of devices that are physically connected to the network medium. These devices are referred to as physical devices.

As illustrated in FIG. 2, each physical device is composed of a system management kernel, one or more application processes and a communications entity. Interfaces between these components within a device are local and are not specified. Brief descriptions of each are provided after the figure followed by architecture descriptions of each in the subsequent subsections.

Application Processes

Application processes (APs) provide the functional capabilities for the device. For Function Block APs , these capabilities are represented by a collection of different block types (e.g. function blocks, and transducer blocks), alarms, and trend objects. These objects, and other that may be included in this type of application process, are specified in the Fieldbus Foundation Function Process specification.

Fieldbus Foundation APs may use the services of either, or both, the FMS and FAS protocols. Function Block APs use FMS and do not directly access FAS.

Whether or not an AP can be loaded into a device during device configuration or network operation is dependent on the physical capabilities of the device and how the AP has been implemented. Some physical devices, such as a PC or PLC, can be implemented to receive their APs as software downloads. Other devices, such as simple transmitters or actuators, may have their Aps implemented in application specific integrated circuits (ASIC).

How many APs a device may contain is also implementation dependent. The Fieldbus Foundation specifications place no restrictions on the number of Aps that a device may contain.

System Management Kernel

A physical device may have a special AP that is responsible for providing a base level of interoperablilty with other devices on the network. This AP is known as system management kernel (SMK). It is specified in the Fieldbus Foundation System Management System Services specification.

To fulfill its responsibilities, the SMK performs five types of operations:

1. receipt of the device tag and the network address (data link layer) for the device from an external system manager application.,
2. maintenance of the application clock time (system time) distributed by an external system manager application,
3. providing services to device applications for locating and identifying remote devices, and for locating remote application objects.
4. maintenance of system management information for the device in the system management information base (SMIB),
5. executing function blocks according to the schedule contained in the SMIB.

As shown in FIG. 2, two application layer protocols are used by the SMK. The FMS protocol, which is contained within the Communications Entity, provides access to the SMIB. Access to the SMIB is provided to allow configuration of a device's system management parameters, and to allow remote applications to obtain management information from the device, either before or during network operation.

The system management kernel protocol (SMKP) is a special purpose application layer protocol used to support all other types of operation. This protocol is defined as an integral part of the SMK, and is therefore, not part of the Communications Entity for the device.

When a fieldbus device does not contain a SMK, its tag, its network address, and certain SMIB information must be either built-in or pre-configured through some local means. In addition, it will not be able to receive the synchronized application clock time.

Communications Entity

The communications entity for a device is composed of the layer protocols and, optionally, the Network Management Agent. Of the layer protocols, only FMS is optional. It is present if SMIB access is supported, if the Network Management Agent is present, or if any of the device APs use it.

The fundamental purpose of the layer protocols is to provide Virtual Communication Relationships (VCRs). VCRs are communication channels between applications. FMS provides VCR application messaging services, such as reading and writing variables. FAS provides VCR message transfer services to FMS and to APs. FAS maps these services to the capabilities of the data link layer, thereby insulating FMS and APs from the details of the data link layer, and also providing a consistent way of using the data link layer.

The data link layer protocol provides the system management kernel protocol and the FAS protocol access to the fieldbus medium for the transfer of messages between applications. Access is provided on a scheduled (cyclic) basis and on an unscheduled (acyclic) basis by a special data link layer entity known as the Link Active Scheduler (LAS).

Each link segment of the network contains one and only one LAS. The purpose of the LAS is to poll devices for their data according to a schedule, and to distribute a priority-driven token to devices between scheduled transfers. This token is used by devices for unscheduled access to the network.

Physical layer protocols provide the data link layer protocol the ability to send and receive data independent of the physical medium type. The type of physical medium supported by a device may be any one of those defined by the IEC physical layer specifications, such as twisted wire or fiber optics.

All fieldbus devices contain at least one physical layer entity, as does each port in a bridge device. Devices that support media redundancy contain one physical layer entity for each physical medium to which they are attached.

VCRs

APs gain access to VCRs at VCR endpoints. Three types of VCR endpoints are defined to support three types of AP interactions, as shown in the table of FIG. 3. The table also shows the mode of data link operation and the type of data link addresses used by VCR endpoints. Although the SMK accesses the data link layer through SMKP and does not use VCRs to communicate, it is included in the table to show its use of the data link layer.

Communications Entity

Overview

The architecture of the fieldbus communications entity has been designed in accordance with the concepts specified in the ISO OSI Reference Manual (ISO 7498). However, as described above, the fieldbus architecture is composed of only three layers, instead of the seven specified by the ISO OSI Reference Manual. The architecture is illustrated in FIG. 4.

FIG. 4 illustrates that the SMK, device APs, and the network management agent all have access to the service of FMS. The SMK also has direct access to the data link layer when communicating through its SMKP. Some device APs may not use FMS. Instead they access FAS directly.

FIG. 4 also illustrates that Media Access Unit (MAU) redundancy is supported by the physical layer. When redundant links (up to 8) are present the Physical Media Dependent sublayer selects from the available links and passes a single stream of data to the Physical Media sublayer. How the selection is done is not specified.

The protocols of the communications entity are managed by the Network management Agent. Conceptually, the NMA manages objects within the protocols via the Layer Management Entities (LMEs) associated with each layer. From an inter operability perspective, how the NMA actually processes the information is not visible across the network. Therefore, the NMA Specification only defines the information to be accessed, and not the method of access. The following describes each of the layer protocols, how they fit together to provide VCR, and how they are managed by the NMA.

FMS

FMS is the messaging layer of the application layer. It provides services to APs to access remote AP objects and their OD descriptions. The specific services defined by the FMS and the format of the descriptive information that can be accessed in the OD are based on FMS defined object types, such as variables and events. To make AP objects visible across the network (accessible through FMS services), they must be represented using an FMS object type. A complete list of FMS object types is shown in the table of FIG. 5.

FMS services are provided to APs at VCR Endpoints. VCR Endpoints represent the attach point of an AP to a VCR. The services available at an endpoint depend on the endpoint type. Note that FMS never performs the requested service, it only conveys the requests and the responses at an endpoint between APs. However, in Function Block APs, many of the services are performed by the Function Block Shell.

When an FMS service is requested, the FMS entity at the requester builds and sends the appropriate request message to the FMS entity at the remote AP. FMS itself has no access to the OD. Therefore, it is the responsibility of the FMS user to encode the user data contained in the message. If the message type indicates that a response is not necessary, the service is unconfirmed.

If a response is necessary, the service is confirmed. Confirmed services always require the remote AP to issue a response indicating whether or not it was able to perform the service. When it was not, the remote AP responds by returning an error code. These messages are technically referred to as FMS Protocol Data Units (PDUs).

Confirmed services are used to manipulate or control AP objects. For example, they are used to read and write the value of the variables, they are also used to access the OD. Confirmed services use client/server VCRs for the exchange of their request and responses. To support this type of VCR, FMS provide flow control for service requests. That is, FMS maintains a counter of submitted requests for which responses have not yet been received, and will not accept additional requests while the counter holds at a specified limit.

Unconfirmed services are used to publish data and to distribute event notifications. Published data is conveyed using Publisher/Subscriber VCR. Event notifications are conveyed over Report Distribution VCRs. The difference between these two VCR types lies in how FAS uses the data link layer to transfer the messages. This difference is explained in the FAS description below. The table of FIG. 5 summarizes the FMS object and their services.

FAS

FAS provides VCR Endpoints access to the data link layer. Each VCR endpoint type uses a specific subset of the data link capabilities to provide a single model of access. The portion of the VCR Endpoint definition for FAS is a combination of the message transfer role and the specific subset of FAS services and data link capabilities. The data link capabilities for the VCR Endpoint are defined in FAS and not in the data link layer because they need to be provided to the data link layer at access time, and not at endpoint definition time. The primary characteristics VCR endpoints are shown in FIG. 6.

Therefore, the Fieldbus protocol describes the format and use of connection endpoints, also known as VCRs (Virtual Communication References) to keep track of different types of logical connections between devices. There are three major types of connections, and therefore three major types of VCRs. These types of connections are referred to in the Fieldbus specification as QUB (Queued User-triggered Bi-directional Application Relationship End Point (AREP) class), QUU (Queued User-triggered Unidirectional AREP Class), and BNU (Buffered Network-Scheduled Unidirectional AREP Class) connections. These different types of connections are used to carry out different types of Fieldbus communications, such as client/server requests (QUB), trend and alarm reports (QUU), and deterministic communication (BNU).

In prior art Fieldbus systems, user applications are required to handle the details of connections, and thus user applications are required to maintain information on VCR. Therefore, an improved system and method is desired which provides simplified communication management in a Fieldbus system.

Tag Parameter Access

The Foundation Fieldbus protocol specifies that a user can access parameters using a tag parameter construct. However, the Foundation Fieldbus protocol does not specify or describe any method for accomplishing this type of accessing.

Prior art systems or software that provide access to fieldbus provide a low level interface which interface requires the user to have a good knowledge of the fieldbus protocols. These prior art systems or software allow a user to use a tag parameter construct. However, these systems require the user to perform a significant amount of pre-configuration operations, and these pre-configuration operations require a good knowledge of fieldbus protocols. More particularly, these prior art systems require the user and/or the user application to perform connection management operations, including creation of VCRs, as well as assigning names to indexes and mapping the tag parameter with the VCR and index number, thus complicating the development of user applications. For example before the user application can talk to any device, a connection has to be established with the other device. The prior art system interfaces for establishing a connection require the user to know the details of this connection and also whether a read or write of a parameter is to be performed. The prior art interface also requires the user to know the index of the parameter within the device.

Further, the index or the parameter in the device can potentially change if a new function block is instantiated or an existing function block is de-instantiated. In prior art systems the user is required to manually change the configuration in response to these changes.

Therefore, an improve parameter access or object access method is desired which automatically performs connection management and name to index conversion, thus making these invisible to user applications. This would considerably simplify application development in a fieldbus system.

SUMMARY OF THE INVENTION

The present invention comprises a system and method for accessing parameters or objects using a tag parameter construct in a fieldbus system. The present invention enables access to parameters or objects using the tag parameter construct without requiring the user to perform any pre-configuration of connections or name to index mappings. This considerably simplifies user development of applications in a fieldbus network.

The NI-FBUS API of the present invention thus provides a tag parameter interface, wherein the user is completely shielded from all fieldbus foundation protocol details. According to the present invention, the user is not required to have any knowledge about the details of the VCR, how to set up or establish the VCR, or even that an entity called "VCR" exists in the system. Also, the present invention automatically maps the parameter name to an index, and thus the user is shielded from the details of construction of the device. Also, if a new function block is instantiated or an existing function block is de-instantiated, the method of the present invention handles the configuration management without requiring any user involvement.

The fieldbus system preferably comprises a computer system, a fieldbus coupled to the computer system, and one or more devices coupled to the fieldbus. The computer system interfaces to the fieldbus through a fieldbus interface, preferably a fieldbus interface card comprised in the computer system and adapted for communicating to the fieldbus.

The method comprises first receiving an access request from a user application to access a device. The request includes a tag name and a parameter name, wherein the tag name corresponds to a block on a device, and the parameter name corresponds to a parameter in the block. In the preferred embodiment, the access request comprises a tag parameter construct, wherein the tag parameter construct comprises only the tag name and the parameter name.

The method automatically configures a connection in response to the request. The connection preferably comprises at least one of a QUB, QUU or BNU connection. When the access comprises a connection between the user application and a device, then the method configures the connection between the user application and the device, or more specifically, configures a connection between the fieldbus interface in the computer system and the device. The method preferably configures and establishes a virtual communication relationship (VCR) between the user application and the device in response to receiving the request, as described further below. Where the fieldbus system includes one or more bridges located between the fieldbus interface and the device, the method automatically configures the one or more bridges located between the fieldbus interface and the device to enable the communication.

When the access comprises a connection between first and second devices, then the method configures the connection between the first and second devices. More specifically, the method configures and establishes a virtual communication relationship (VCR) between the first and second devices. Where the fieldbus system includes one or more bridges located between the first and second devices, the method also automatically configures the one or more bridges located between the first and second devices to enable the communication.

The method also automatically determines an index of the parameter using the parameter name and the tag name in response to the request. Where an object is being accessed that is not a parameter of a block, then the method automatically determines the index of the block.

After the method has configured and/or established the connection and performed name to index conversion, the method performs the access request. In the case of the user application connecting to a device, the step of performing the access request comprises the user application reading parameters from the device or writing parameters to the device. In the case of a connection between two devices the step of performing the access request comprises the first device accessing or communicating one or more parameter values to the second device.

It is noted that the steps of automatically configuring the connection and automatically determining the index are performed without requiring user pre-configuration of the index or the VCR. Thus connection management and manipulation of parameter indexes are hidden from the user, thus simplifying application development.

The NI-FBUS API of the present invention thus advantageously provides an intuitive system and method for accessing parameters in a fieldbus system. This provides a simplified system and method for developing applications in a fieldbus network. The NI-FBUS API of the present invention thus allows the process engineer or application program developer an easy way of accessing, i.e., reading or writing, parameters in a fieldbus network.

As discussed above, the present invention comprises a system and method for performing connection management in a fieldbus system. The connection management operates generally as follows. When the access comprises a connection between the user application and a device, the connection management method comprises automatically configuring and establishing a virtual communication relationship (VCR) between the user application and the device.

In each case, the method first determines if a virtual communication relationship (VCR) exists. In the case of a desired connection between the user application and the device, the method determines if a VCR exists for the device. In the case of a desired connection between first and second devices, the method determines if a VCR exists between the first and second devices.

If a VCR does exist, then the method opens the VCR and operation completes. If a VCR does not exist, then, in the case of a desired connection between the user application and the device, the method creates one or more of a local VCR endpoint or a remote VCR endpoint. In the case of a desired connection between first and second devices, the method creates one or more of a first device VCR endpoint or a second device VCR endpoint.

The method then creates a VCR. In the case of a desired connection between the user application and the device, the method creates a VCR between the user application and the device. In the case of a desired connection between first and second devices, the method creates a VCR between the first and second devices.

The method is preferably operable to create either a QUB, QUU or BNU connection, depending on the request received. It is noted that the method may also configure linkages between two devices, such as in the case of a BNU connection.

As discussed above, the present invention also comprises a system and method for accessing parameters or objects by name in a fieldbus system. More particularly, the present invention comprises a system and method for enabling applications to access parameters or objects by name in a fieldbus system. The NI-FBUS API of the present invention includes a method of performing name to index conversion which allows the developer to utilize parameter names when accessing parameters. The system and method of the present invention includes two different methods which offer users access to parameters by name. The method used depends on the type of object in the device the user desires to access. The first method is used for block parameter access, and the second method is used when the user desires to access (read or write) objects in a device that are not parameters of a block.

The first method of the present invention is used when the user application desires to access (read or write) a block parameter. Block parameters reside within blocks contained within a Fieldbus device, such as function blocks, transducer blocks, and resource blocks. The user application specifies the name of the parameter to read or write, and specifies the block, either by block tag (a text string) or by block descriptor (which was returned to the user from a previous call to open the block). The user or developer preferably specifies a parameter access request using the syntax "block-Tag.param".

When the method receives the parameter access request, the method first determines the index of the block, either by using the stored index of the block or by locating the index of this block using a $FIND_{13}$ TAG service. After the index is determined, the method locates the symbol file for the virtual field device (VFD) that contains this block. The method then determines or looks up the parameter name in the symbol file in order to locate the device description name. Once the device description (DD) name has been located, the method obtains the index of the parameter from the device description name information, either from a cache entry or by using a find service. The method then adds the parameter index numeric value to the block index numeric value to obtain the actual index of the parameter. This actual index is inserted into the packet, and the user's request is performed with the calculated index, i.e., the parameter access request is performed using the calculated index.

The second method is used when the user application desires to access (read or write) objects in a device that are not parameters of a block. The Fieldbus Foundation specification describes several objects that are used in configuration of devices and networks that do not belong to any block. Examples are trend objects, MIB (Management Information Base) parameters, and linkage objects. These objects are also accessed over the Fieldbus by an index, and the method of the present invention can be used to enable user applications to access these objects by name.

First, the user or developer specifies a parameter access request using the syntax "Object name". Thus, according to the present invention, the user can specify an object access, i.e., an object read or an object write, by simply using the syntax which references the object name which is desired to be accessed. In response to the object access request, the method determines whether the object being accessed is an MIB object. If the object being accessed is not an MIB object then the method looks up the object name in an internal VFD name mapping table, and the VFD directory object to determine the index. If the object being accessed is determined to be an MIB object, then the method looks up the object name in the internal MIB name mapping table and uses the MIB directory object to determine the index. After the method had determined the index of the parameter name or object, the method then performs the user's request with a calculated index. Thus, the method inserts the index of the parameter name desired to be accessed into the appropriate packet for transmission on the bus in order to access the desired object.

BRIEF DESCRIPTION OF DRAWINGS

A better understanding of the present invention can be obtained when the following detailed description of the preferred embodiment is considered in conjunction with the following drawings, in which:

FIG. 1 illustrates a VCR type summary;

FIG. 3 illustrates the types of VCR endpoints;

FIG. 5 is a table summarizing FMS object types and their services;

FIG. 6 is a table summarizing the primary characteristics of VCR endpoints;

Figure 2:
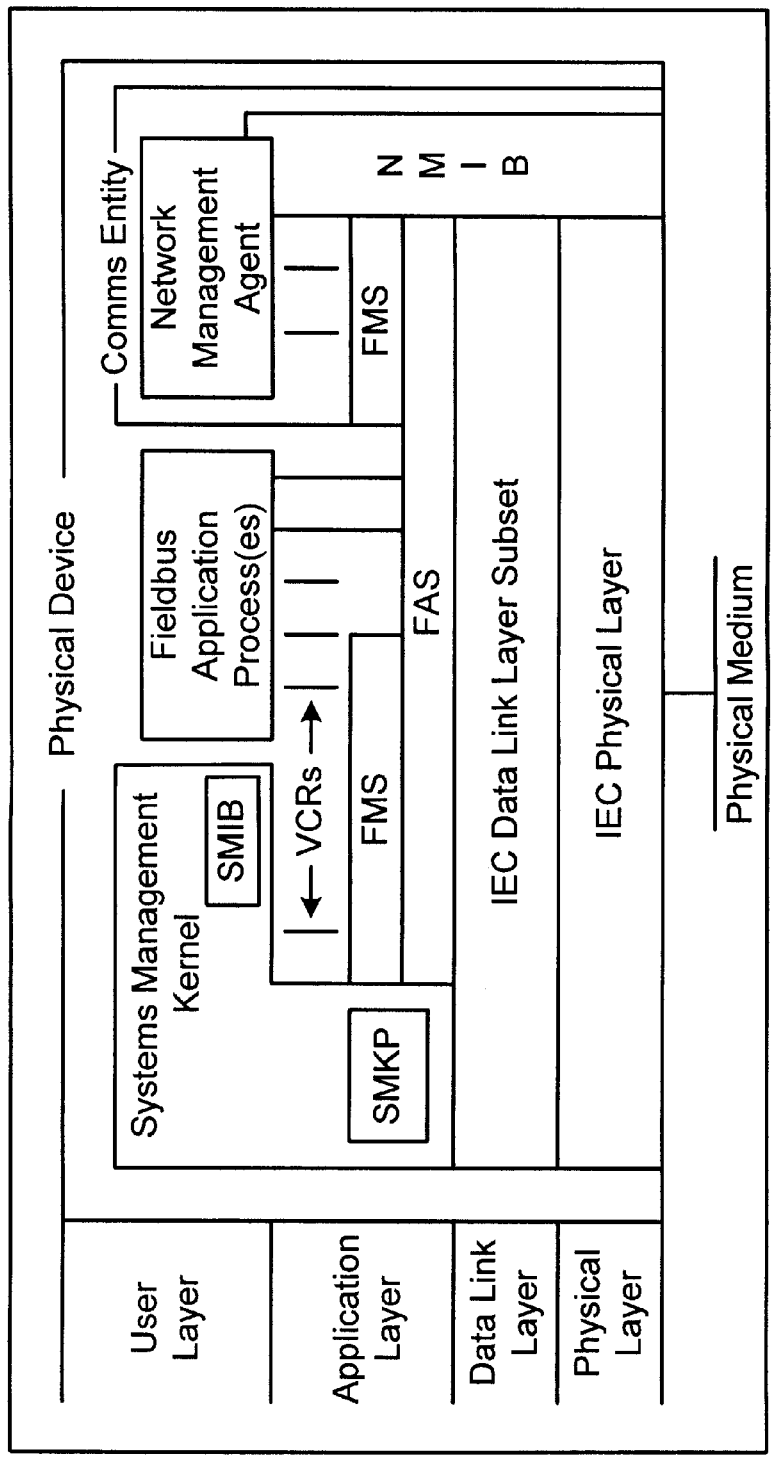
FIG. 2 illustrates the Fieldbus Foundation device architecture.
Figure 4:
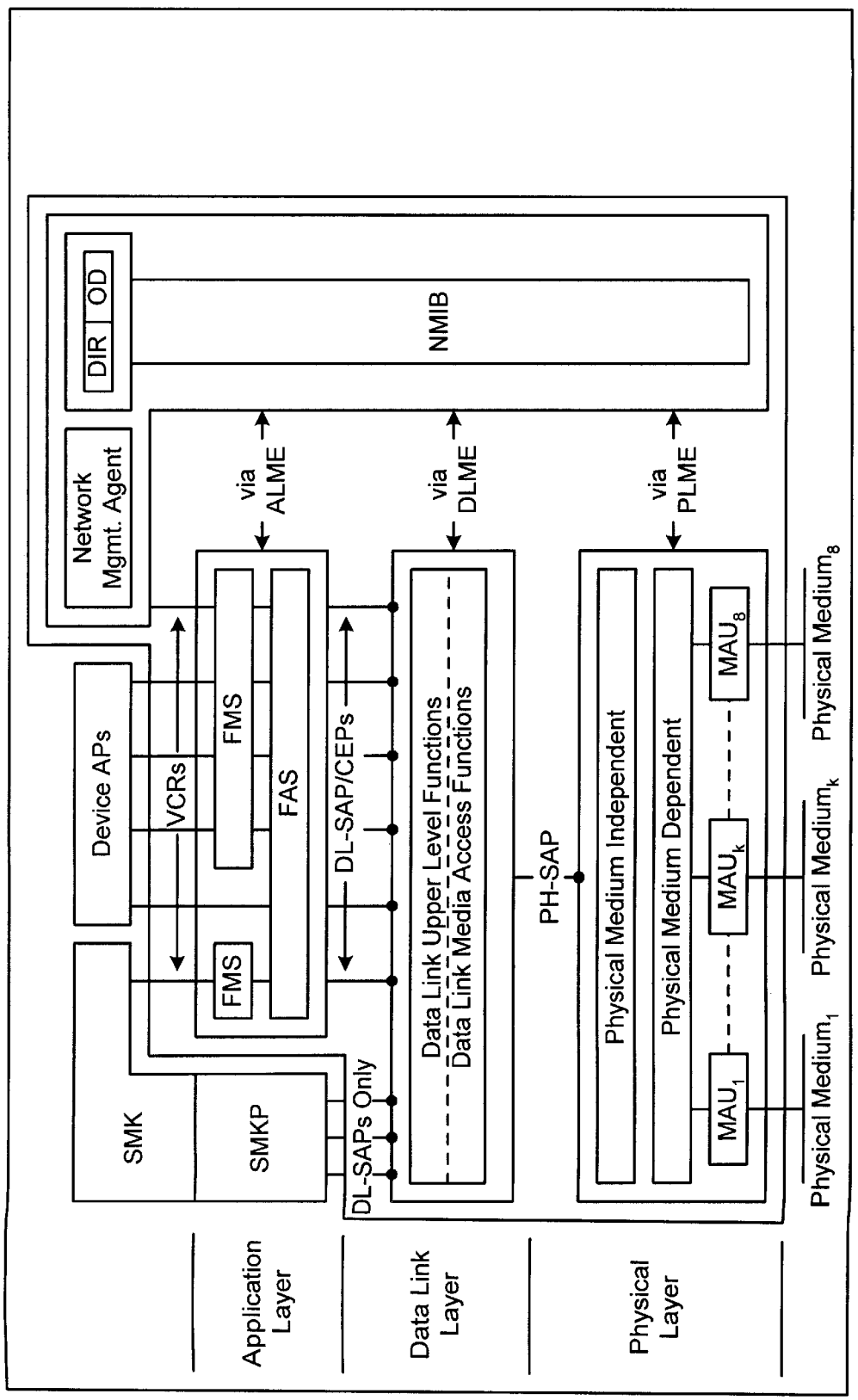
FIG. 4 illustrates the Fieldbus Communications Entity architecture.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defamed by the appended claims.

DETAILED DESCRIPTION OF THE PREFERRED EMBODIMENT

Incorporation By Reference

The Fieldbus Specification, Document FF-94-801, available from the Fieldbus Foundation, is hereby incorporated by reference in its entirety as though fully and completely set forth herein.

Figure 7:
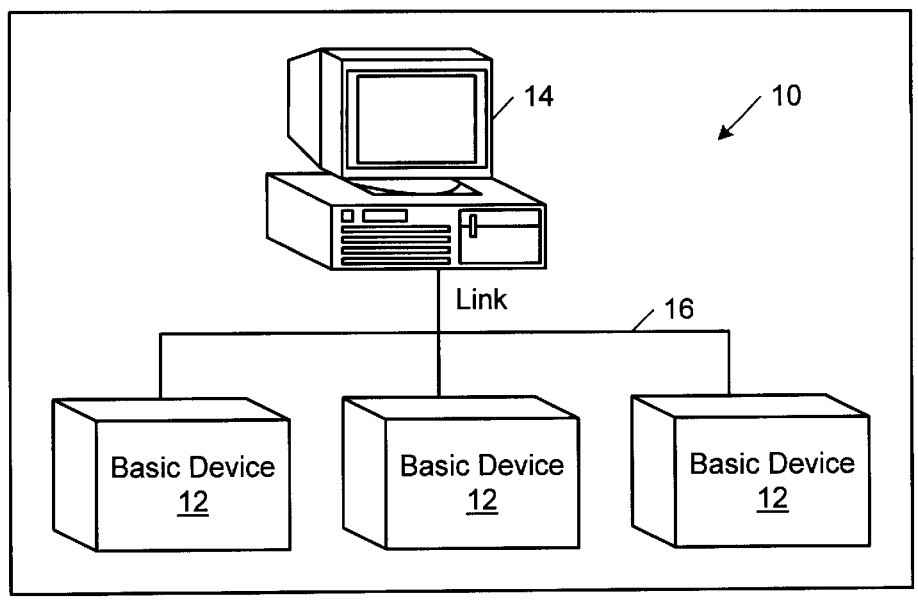
FIG. 7 is a simplified block diagram of a fieldbus network.

FIG. 7—Fieldbus Network

FIG. 7 is a block diagram of a simple single link fieldbus network 10. The fieldbus network 10 comprises a process control network system. In the present application, the term "Fieldbus" is intended to include any of various types of process control networks, including the Foundation Fieldbus fieldbus network, among others.

System 10 is comprised of a fieldbus 16 and a plurality of fieldbus devices 12 connected to fieldbus 16. Fieldbus devices 12 and fieldbus 16 are preferably compliant with the Fieldbus Specification published by the Fieldbus Foundation. However, as noted above, fieldbus devices 12 and fieldbus 16 may be compliant with other types of fieldbus networks or fieldbus specifications, as desired. The Foundation Fieldbus network is comprised of devices connected by a serial bus, referred to as the fieldbus 16. However, it is noted that the fieldbus 16 may comprise any of various types of data buses, as desired. The network portion shown in FIG. 1 is referred to as a "Link" or a "Segment". Segments can be separated by special devices called bridges.

Fieldbus devices 12 each include one or more function blocks which perform functions or operations in the system. Fieldbus devices 12 also preferably each include a function block shell. More particularly, fieldbus devices 12 include a memory element or memory media which stores one or more function blocks and a function block shell or interface. Fieldbus devices 12 are capable of generating fieldbus packets on fieldbus 16. Each fieldbus device 12 is assigned a permanent network address. The fieldbus devices 12 illustrated in FIG. 1 may include devices such as PAID, Analog Input, and Analog Output devices, among others.

One or more of the fieldbus devices 12 preferably comprise Fieldbus "round cards". A fieldbus round card comprises a logic device, preferably configured as a round PCB card, which includes processing logic. Each fieldbus device round card includes one or more function blocks (user applications) stored on the round card in a memory, and a function block shell according to the present invention stored in a memory.

As discussed above, fieldbus devices may have various types of blocks, including function blocks, a resource block, and one or more transducer blocks. A function block includes A block parameter that is written to the bus is referred to as a published parameter. A block parameter that is receiving data is referred to as a subscribed parameter.

System 10 also includes an interface device 14, such as a computer system, coupled to the fieldbus bus. The computer system 14 includes a display screen and one or more user input devices, such as a keyboard and/or pointing device, which enables the user to interact with the computer system 14. The computer system includes various standard components, including one or more CPUs, memory, etc.

The computer system 14 preferably includes, i.e., stores and executes, one or more programs which execute on the host computer that communicate with function blocks and/or devices in the fieldbus network. Examples of these types of programs include programs which monitor the network or monitor values on the network, for recording purposes as well as displaying the results to the user. These one or more programs or applications preferably execute solely on the host computer, which is coupled to the fieldbus network.

The computer system 14 includes, i.e., stores and executes, an application programming interface (API) according to the present invention. The API comprises functions or methods which are used for fieldbus communication and other functions. The programs mentioned above access the fieldbus, i.e., communicate packets to the fieldbus bus, through the application programming interface (API) according to the present invention. The API according to the preferred embodiment of the present invention is preferably the NI-FBUS API available from National Instruments Corporation. The API of the present invention includes connection management according to the present invention which simplifies user programming and control of connections or VCR (Virtual Communication Relationships).

The NI-FBUS API of the present invention is preferably stored on a memory media of the computer system, such as system memory, e.g., DRAM, SRAM, EDO RAM, etc., or non-volatile memory such as a magnetic media (hard disk) or optical storage. The term "memory media" also includes installation media, such as a CD-ROM, floppy disks, or other portable media, or memory which stores the API program for installation over a network The host computer system 14 may also store and execute a fieldbus configuration utility to enable the user to create a fieldbus configuration. The fieldbus configuration created by the fieldbus configuration utility is a distributed application which is downloaded to the various fieldbus function blocks or devices and runs automatically. The fieldbus configuration utility also preferably uses certain NI-FBUS function calls for managing VCR in the fieldbus network.

Figure 8:
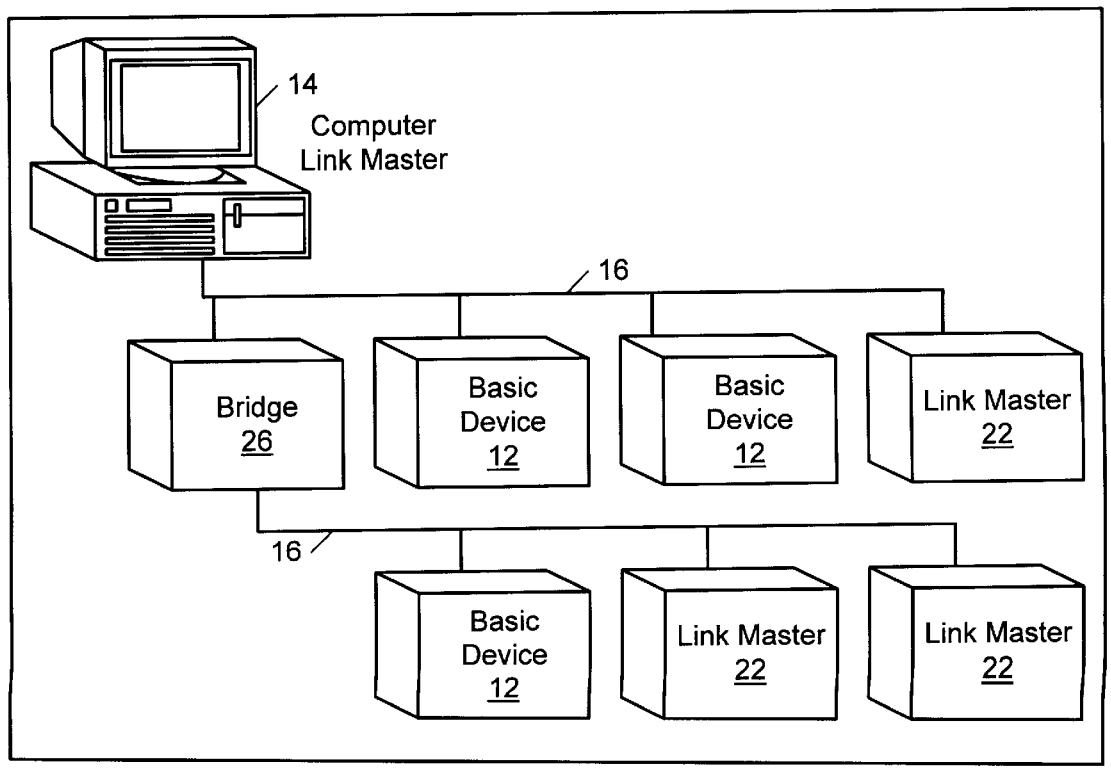
FIG. 8 is a simplified block diagram of a fieldbus network including a bridge, one or more basic devices, and one or more link masters.

FIG. 8: Fieldbus Devices

Referring now to FIG. 8, there are generally three types of devices 12 on a fieldbus network, these being a Link Master 22, a Basic Device 24 and a Bridge 26. Link master 22 is a device which has the capability of orchestrating communications traffic on a fieldbus segment. This device can be a DCS or can be any other device such as a valve or a pressure transducer. Link Master 22 is necessary to prevent multiple devices from communicating their data at the same time. Basic Device 24 is a device without Link Master capability. Bridge 26 is a device that connects two or more links. As shown in FIG. 8, although the computer 14 in FIG. 2 is configured as a Link Master, the reference numeral 14 is still used to designate the computer 14, even though the computer 14 in FIG. 2 operates as a link master 22.

Figure 9:
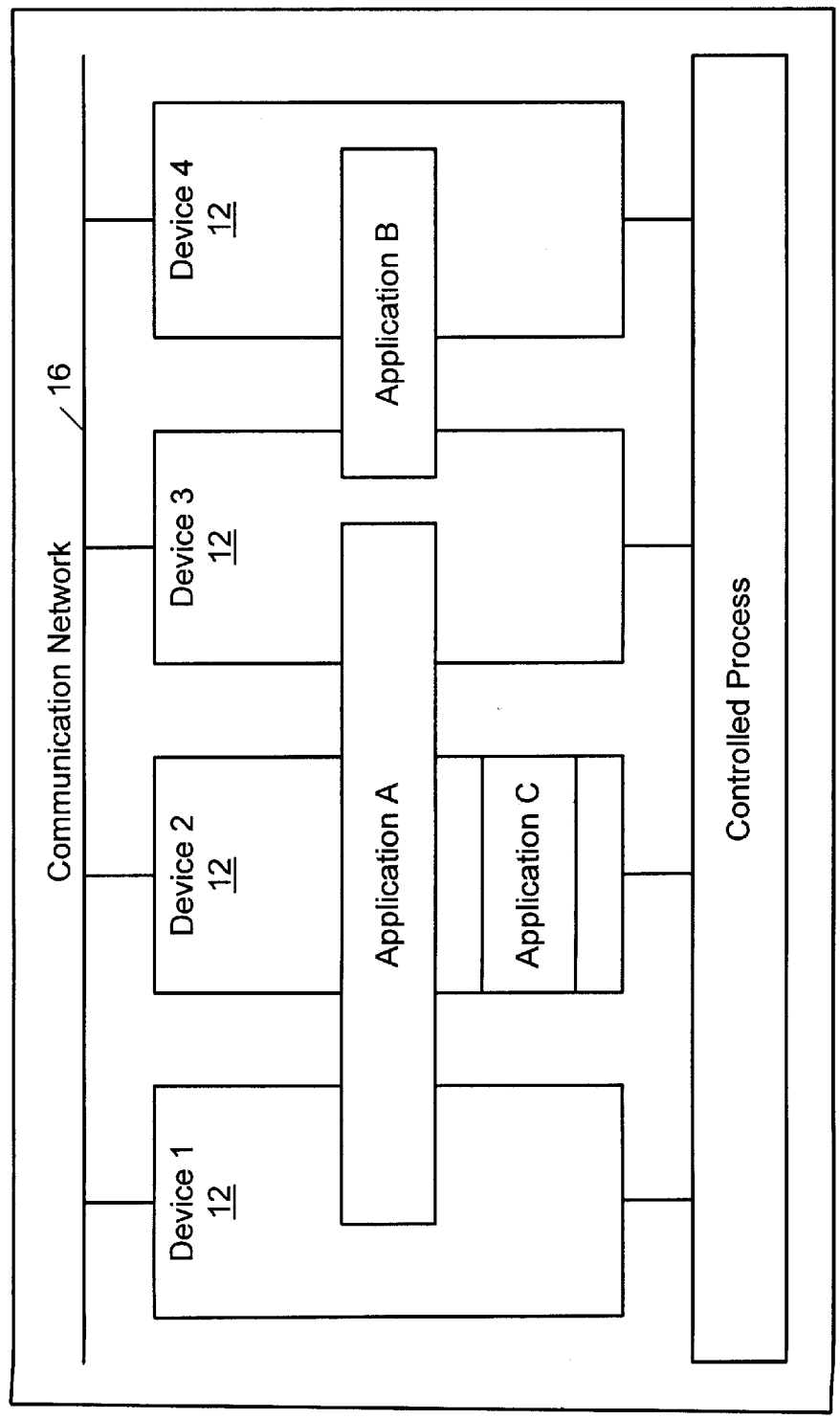
FIG. 9 illustrates a process measurement and control system.
Figure 10:
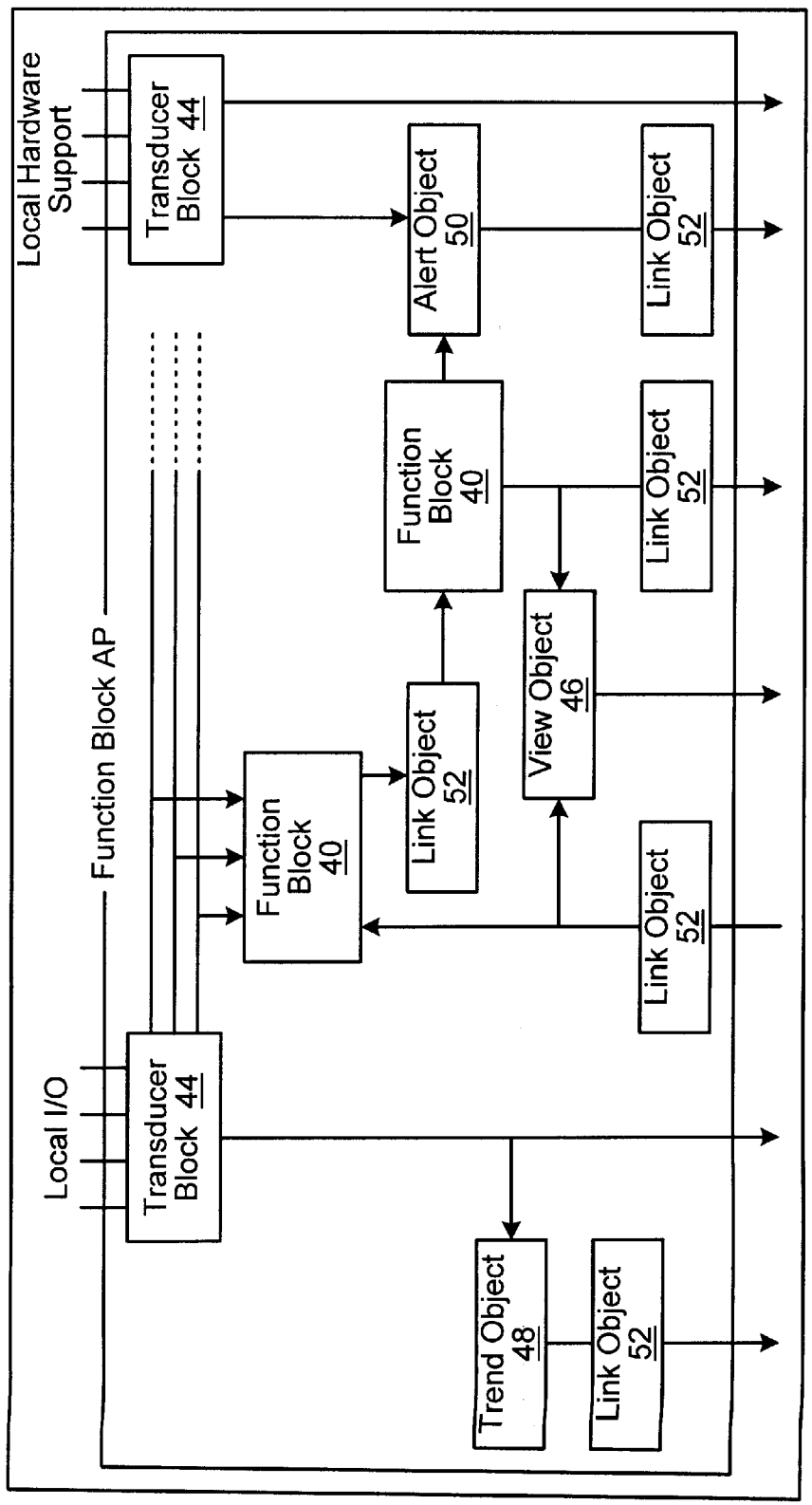
FIG. 10 illustrates function block linkages.
Figure 11:
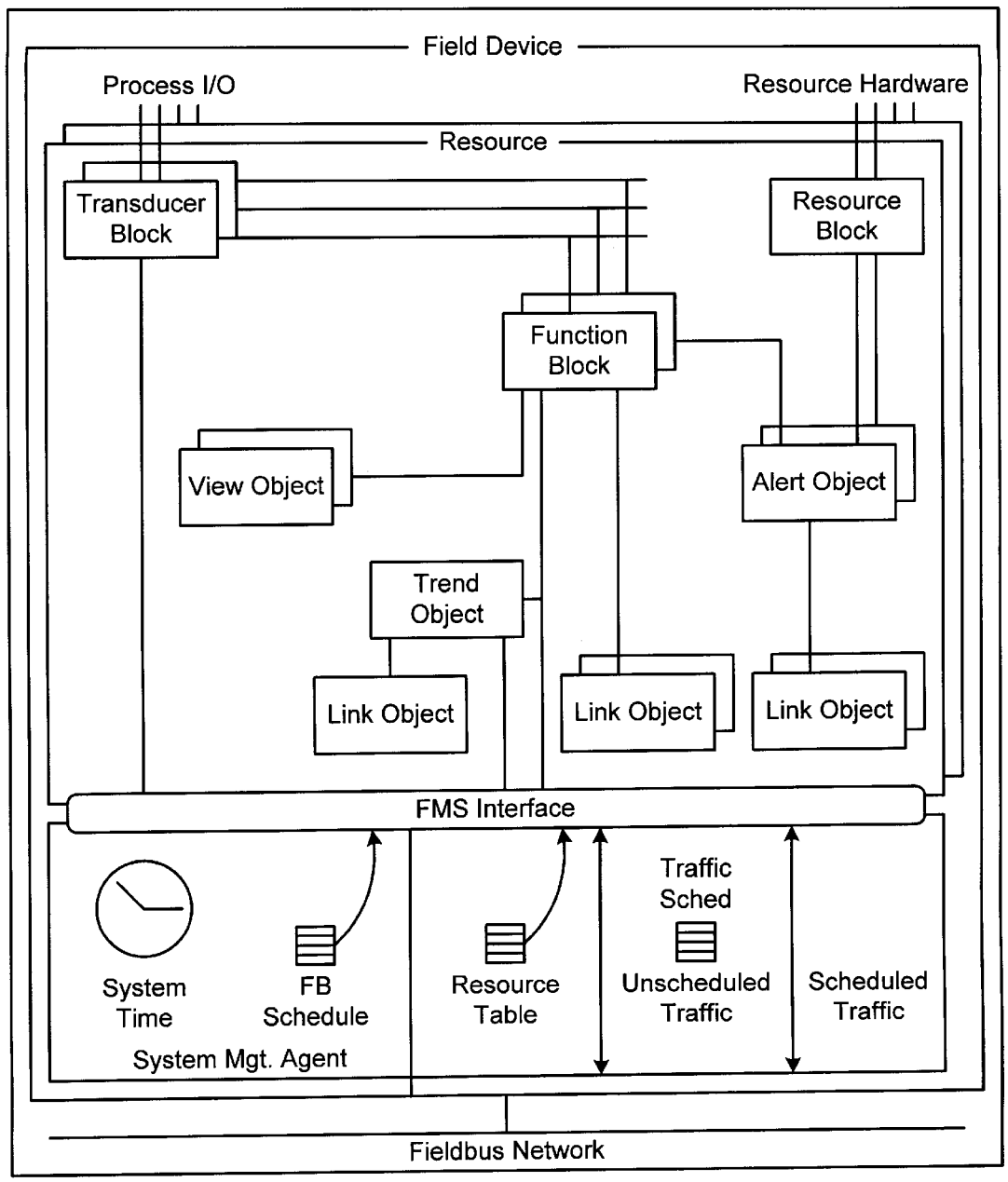
FIG. 11 illustrates components of a function block application architecture.

FIGS. 9–11: Fieldbus Architecture

Referring now to FIG. 9, the Fieldbus Foundation Specification defines the framework necessary to support a fieldbus process measurement and control system. A fieldbus system is comprised of a collection of devices 12 interconnected and communicating with each other by means of fieldbus communication network 16. Each device is an independent physical entity capable of performing one or more specified functions in a particular context and delimited by its interfaces. Each major function performed by this system is modeled as an application which may reside in a single device or may be distributed among several devices. As shown in FIG. 3, the function block application comprises an integrated set of function block application processes (AP's) which reside on a common fieldbus communication network.

Application parameters, representing data and/or events, are contained by-one or more resources within a single device or distributed between multiple devices. The processing of these application parameters is performed through function blocks. The function block application process architecture is the framework within each field device to support the execution and coordination of function blocks, and the exchange of information between them.

Function block APs are APs that are constructed from function blocks. Function blocks model repetitive, time-critical functions of APs as parametric algorithms that transform input parameters into output parameters. The term repetitive means that function blocks are invoked (execute) repeatedly, based either on a schedule or the occurrence of an event. When invoked, the function blocks run to completion. The function Block AP model its virtual field device (VFD) as a resource. The resource represents the network visible hardware and software objects that comprise the AP.

Interoperation between function blocks is modeled by linking an input of one function block to an output of another. Linkages between function blocks exist within and between Function Block APs. Interfaces between function blocks located in the same device are locally defined. Those between function blocks in different devices use the services of the Function Block Shell. The Function Block Shell provides access to FMS application layer services.

As shown in FIG. 10, function blocks are supported within APs by resource blocks 42 and transducer blocks 44, and by view objects 46, trend objects 48, alert objects 50, and link objects 52. FIG. 11 illustrates the function block application architecture, which defines the internal components of a function block application and specifies how these components interface with each other within the application, and between applications.

The function block application architecture includes one or more function blocks 40, which represent the basic automation functions performed by an application. The function block application architecture also includes transducer blocks 44 and resource blocks 42 which allow the function block application to be as independent as possible of the real I/O and physical device hardware. Link objects 52 provide mapping between communications data and application parameters and communication events and application events. View, trend, and alert objects 46–50 provide a common way of handling function block parameters for human interface views, alarms and events, and historical data. As shown in FIGS. 10 and 11, a function block application process represents function block applications as an integrated set of these components contained in one or more resources that are accessed through its network interface.

Therefore, as discussed above, a field device generally comprises one or more different types of blocks, including function blocks 40, resource blocks 42, and transducer blocks 44, as well as various types of objects. These blocks and objects are discussed in greater detail in the Fieldbus specification, referenced above.

As noted above, a function block 40 represents the basic automation functions performed by an application. A function block 40 comprises an algorithm and one or more parameters associated with the algorithm. A function block 40 processes input parameters according to a specified algorithm and an internal set of contained parameters, and produces output parameters that are available for use within the same function block application or by other function block application. Function blocks 40 model field device functions, such as analog input (AI) functions and PAID (Proportional Integral Derivative) control loop functions, among others. The function block model provides a common structure for defining function block inputs, outputs, algorithms and control parameters. This structure simplifies the identification and standardization of characteristics that are common to function blocks. A collection of one or more function blocks 40 is referred to as a virtual field device (VFD).

A resource block 42 makes visible hardware specific characteristics associated with function block application processes. Resource blocks 42 include a set of contained parameters to represent these characteristics. Resource blocks 42 also include an algorithm that is used to monitor and control the general operation of the physical device hardware.

A transducer block 44 operates to control access to I/O devices through a device independent interface defined for use by function blocks. Transducer blocks 44 insulate function blocks from the specifics of I/O devices, such as sensors, actuators, and switches. Transducer blocks 44 also perform functions, such as calibration and linearization, on I/O data to convert it to a device independent representation View and trend objects 46 and 48 support management and control of function blocks by providing visibility into their configuration and operation, and by providing history information for reviewing their behavior. View objects 46 are provided for the grouping of operator data for efficient transfer and processing, while trend objects 48 provide for short term history data to be collected and stored within a device.

Alert objects 50 generate notification messages when alarms or events are detected. Events are used to report a status change when a function block leaves a particular state, such as when a parameter crosses a threshold. Alarms are used to report not only a status change when a function block leaves a particular state, but also when it returns back to that state. Alert objects 50 report alarm and event occurrences by sending an event notification and waiting a specified period of time for an acknowledgment to be received, even if the condition that caused the alert to be detected no longer exists. If the acknowledgment is not received within a pre-specified time-out period, the event notification will be retransmitted. This method ensures that alert messages are not lost.

Link objects 52 are used to record linking between and within APs. The function block model supports linking between and within APs in order to support system configuration, and the objects used to record this type of information are referred to as link objects 52. Link objects 52 are used to define connectivity between input and output parameters, and they are used to define external access to view, trend, and alert objects. Link objects 52 identify the parameter or object being linked, the FMS service used to transfer the data, and the VCR used for the transfer. For input/output parameter links, the remote parameter is also identified.

Figure 12:
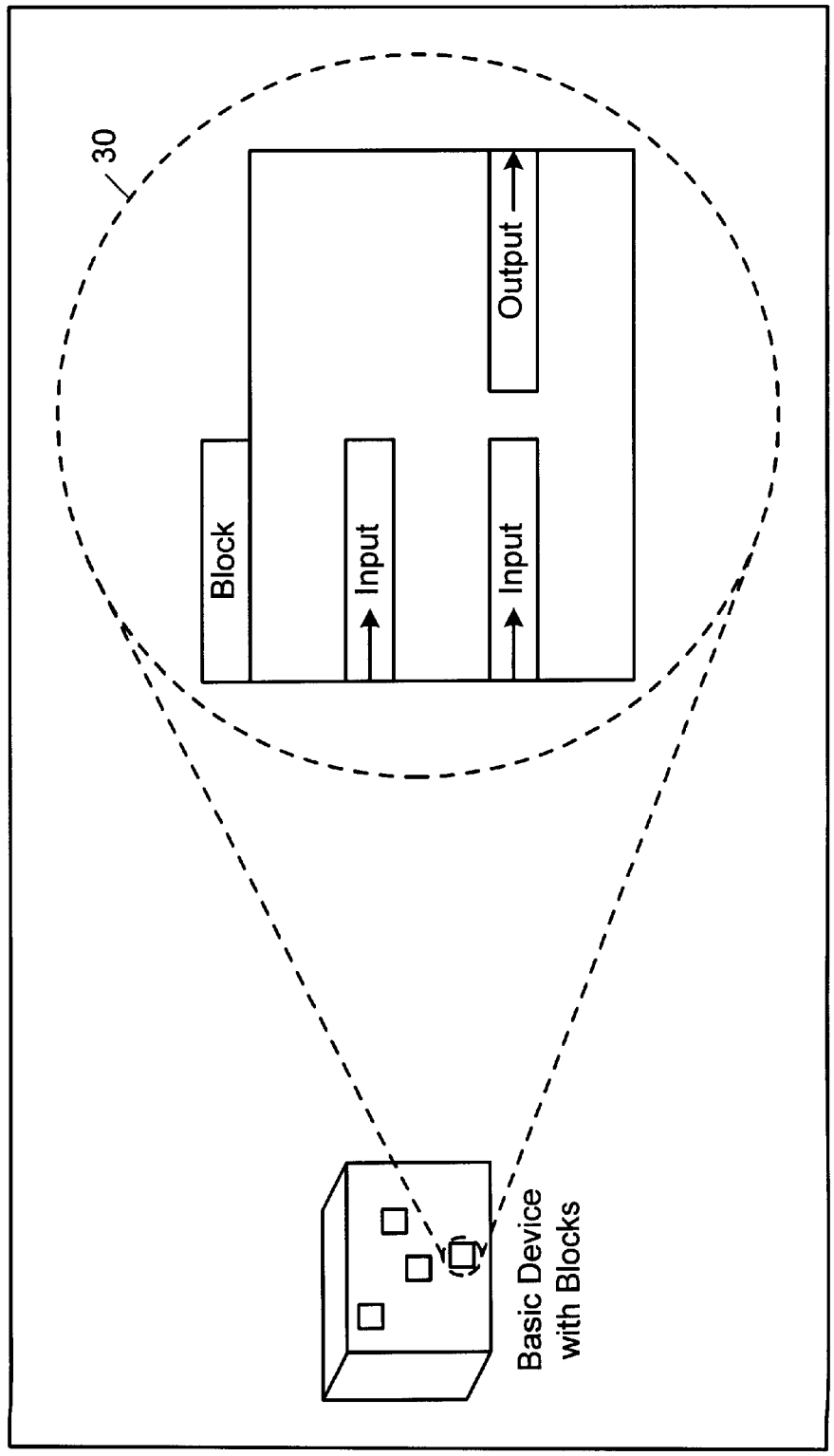
FIG. 12 illustrates function block parameters.

FIG. 12: Blocks and Parameters

Typically a device 12 contains a set of function that it can perform. As shown in FIG. 12, these functions are represented as blocks 30 within the device 12. The blocks 30 are basically containers of algorithms and the parameters controlling the algorithm(s). The specification for Foundation Fieldbus defines 10 standard blocks/algorithms as follows:

Analog Input (AI)
Analog Output (AO)
Discrete Input (DI)
Discrete Output (DO)
Proportional Integral Derivative (PID)
Proportional Derivative (PD)
Bias Gain (BG)
Ratio Control (RC)
Control Selector (CS)
Manual Loader (ML)

The actual function of a block 30 is determined or modified by the settings of block parameters, which can be classed as follows:

Input—Parameter that is to receive data from another block
Output—Parameter that is to send data to another block
Contained—Parameter that neither receives or sends data, but rather is "contained" within the block.

These parameters can also be optionally sub-classed as:
Alarm—Parameters related to alarms
Trend—Parameters related to trending
Tuning—Parameters related to tuning The above classifications of alarm, trend and tuning are independent of the input, output, and contained classifications. For example, an input parameter can also be a trend parameter.

In a similar manner to devices 12, blocks 30 are uniquely identified on the fieldbus by a human readable name or character string name, referred to as a "tag". The block tag is a configurable attribute of the block 30 and is typically used to describe the function as well as location of the block 30. Block tags are unique on a fieldbus network.

Figure 13:
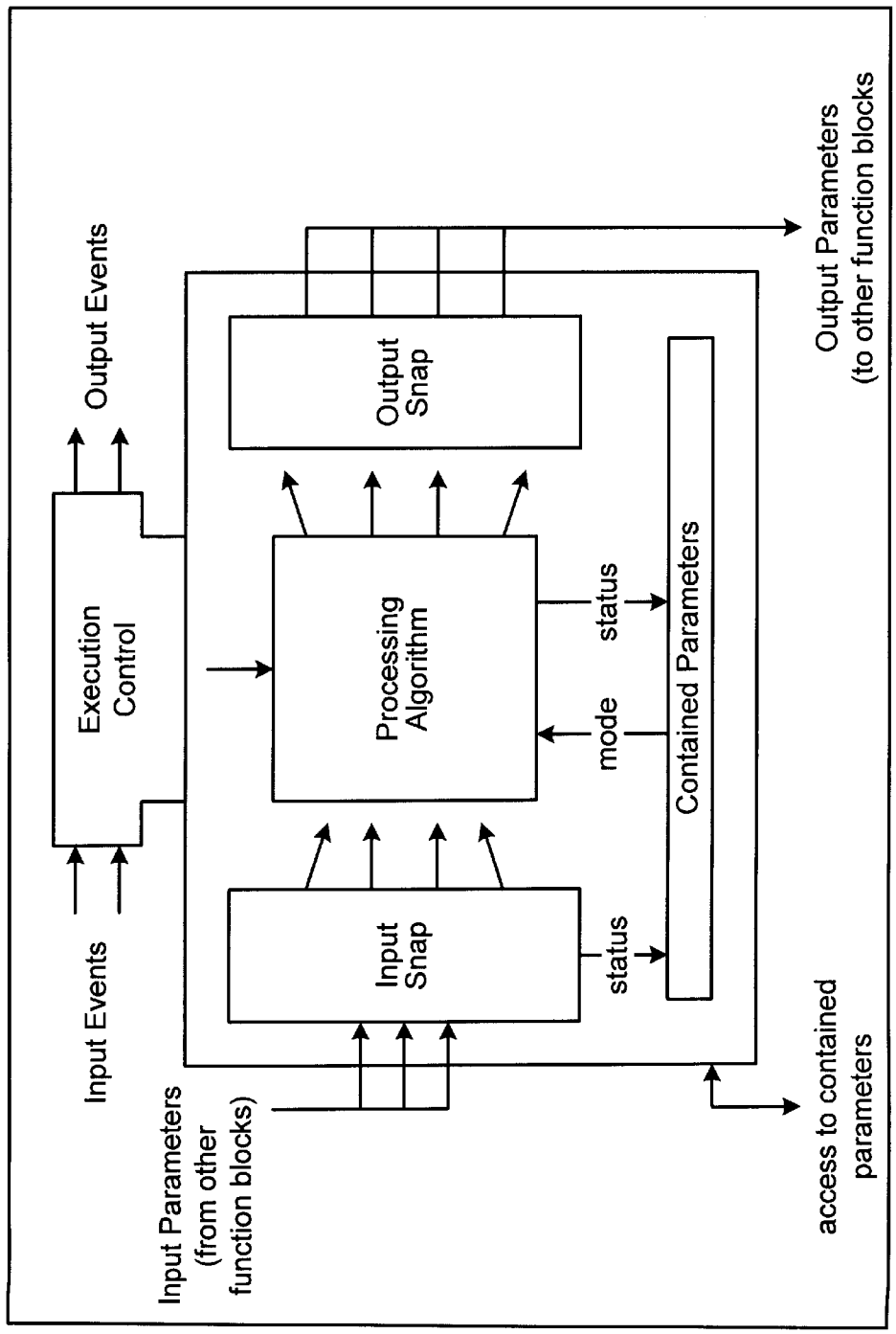
FIG. 13 illustrates internal structure and execution of a block.

FIG. 13—Common Block Model

FIG. 13 illustrates the components of the common block model which describes the general characteristics of function blocks 40, transducer blocks 44, and resource blocks 42. In this figure, input parameter values are collected a synchronously from other blocks and snapped by the block when its execution begins. The input snap process ensures that they are time-coincident and are not changed by external sources during execution. New values received from the network for these parameters do not affect the snapped values and will not be used by the function block during the current execution.

Once the inputs are snapped, the algorithm operates on them, generating outputs as it progresses. Algorithm execution is controlled through the setting of contained parameters. Contained parameters are internal to function blocks and are not visible as normal input and output parameters. However, they may be accessed and modified remotely as specified by the function block.

Input events may also affect the operation of the algorithm. An execution control function is used to regulate the receipt of input events and the generation of output events during execution of the algorithm. Upon completion of the algorithm, the data internal to the block is saved for use in the next invocation, and the output data is snapped, releasing it for use by other function blocks.

Figure 14:
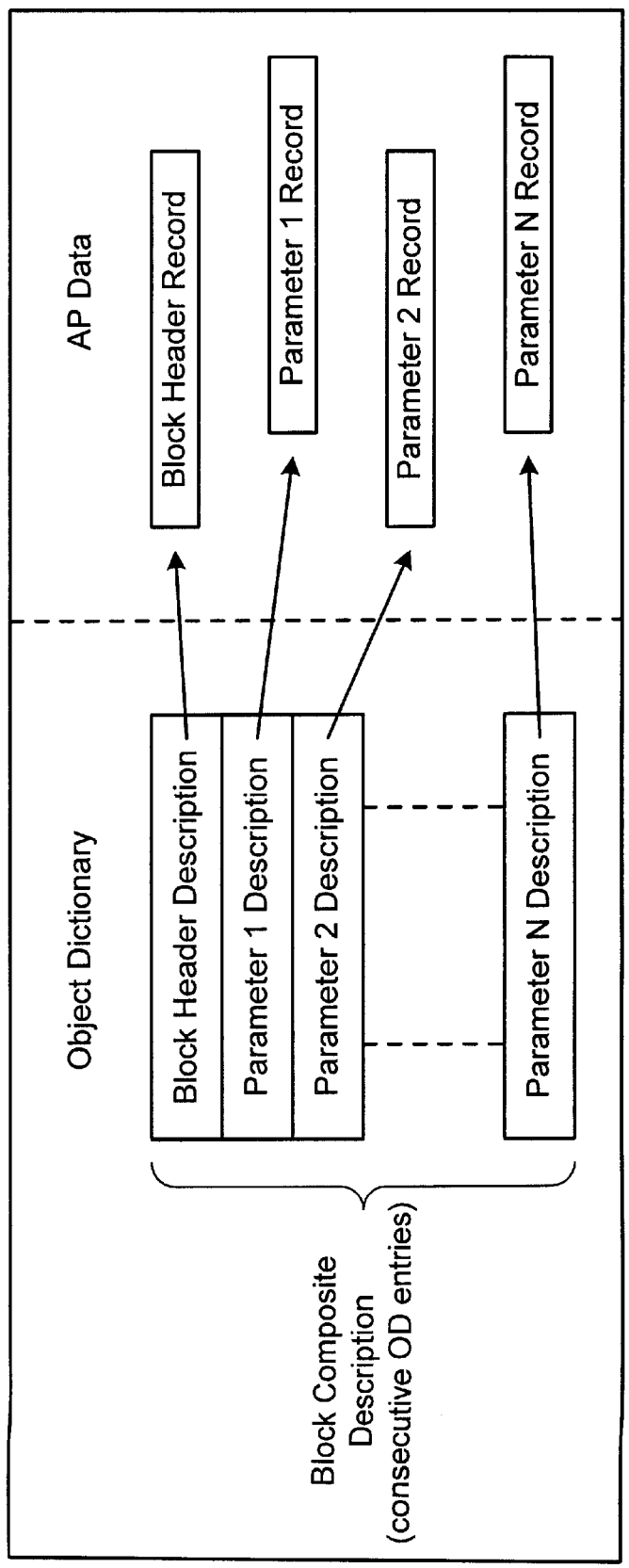
FIG. 14 illustrates a block composite object.

Referring now to FIG. 14, a block is a tagged logical processing unit represented as a composite object. The first object in the composite is the block header, which contains the tag. The tag is the name of the block. System management services are defamed to locate a block by its tag.

The block header is followed in the composite by a list of parameters that represent the input, output, and contained parameters. Parameters are identified within the block by their relative position in the list (Parameter 1 is the first parameter in the list). This permits parameters to be unambiguously identified using the tag parameter construct. The values associated with the parameters and the block header persist from one invocation of the function block to the next. FIG. 8 illustrates the block composite object.

Figure 15:
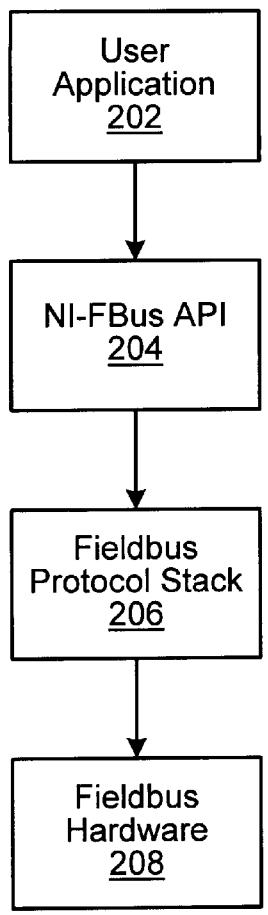
FIG. 15 illustrates the software architecture of a Fieldbus system.

FIG. 15—Fieldbus Software Architecture

Referring now to FIG. 15, a diagram illustrating the software architecture of a fieldbus system according to the preferred embodiment of the invention as shown. As shown, the fieldbus software architecture includes a user application 202 which communicates through an NI-FBUS API 204 according to the present invention. The NI-MFBUS API 204 interfaces through a fieldbus protocol stack 206 to the fieldbus hardware 208. Thus, the user application 202 makes one or more function calls to the NI-FBUS API 204. The functions comprised within the NI-FBUS API 204 in turn communicate through the fieldbus protocol stack 206 to the fieldbus hardware 208.

NI-FBUS API of the Preferred Embodiment

As discussed in the background section, the Foundation Fieldbus protocol specifies that a user can access parameters using a tag parameter construct or interface. However, the Foundation Fieldbus protocol does not specify or describe any method for accomplishing this type of accessing. Prior art Fieldbus systems allow a user to use a tag parameter construct. However, these systems require the user to perform a significant amount of pre-configuration operations. More particularly, these prior art systems require the user and/or the user application 202 to perform connection management operations, including creation of the required VCR as well as assigning names to indexes, thus complicating the development of user applications. According to the present invention, connection management and name to index conversion are both performed by the NI-FBUS API 204 and are thus invisible to user applications. This considerably simplifies application development in a fieldbus system.

Figure 16:
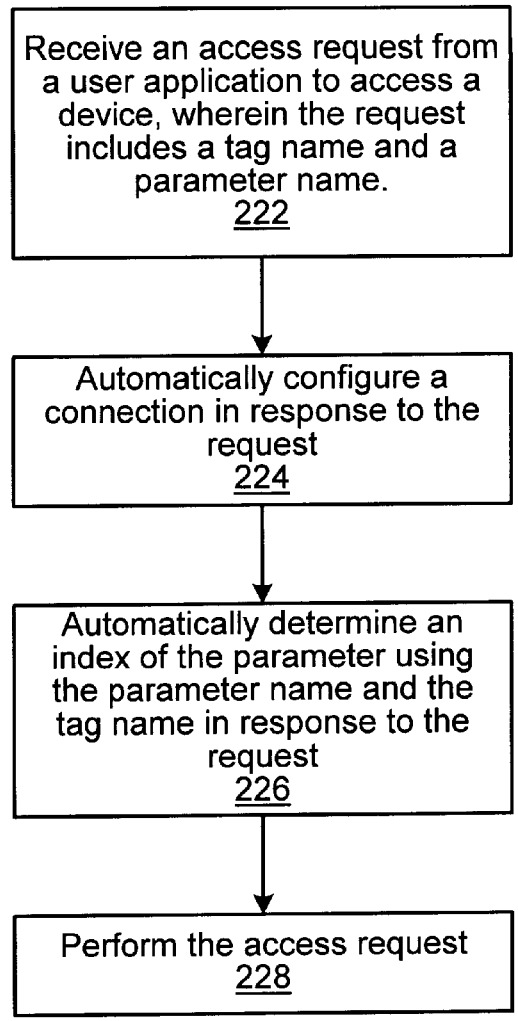
FIG. 16 is a flowchart diagram illustrating automatic handling of a tag parameter access without requiring pre-configuration according to the present invention.

FIG. 16—Flowchart Diagram of the Preferred Embodiment

Referring now to FIG. 16, a flowchart diagram illustrating operation of the present invention is shown. As shown, the present invention comprises a method for enabling access to parameters in a fieldbus system. As noted above, the fieldbus system comprises a computer system, a fieldbus coupled to the computer system, and one or more devices coupled to the fieldbus. The computer system interfaces to the fieldbus through a fieldbus interface, preferably a fieldbus interface card comprised in the computer system and adapted for communicating to the fieldbus. In the flowcharts described below, it is noted that various of the steps may occur concurrently and/or in different orders.

As shown in FIG. 16, in step 222 the method comprises first receiving an access request from a user application to access a device. The request includes a tag name and a parameter name, wherein the tag name corresponds to a block on a device, and the parameter name corresponds to a parameter in the block. In the preferred embodiment, the access request is in the form of "tag parameter", wherein the tag parameter construct comprises only the tag name and the parameter name. In the present disclosure, the term "parameter" includes both parameters of blocks, such as function blocks, transducer blocks, and resource blocks. The access request involves accessing parameters or objects, i.e., either reading or writing parameters or objects, either between the user application and a device, or configuring access between two devices.

In step 224 the method automatically configures a connection in response to the request. The connection preferably comprises at least one of a QUB, QUU or BNU connection. In the present disclosure, the method "automatically configuring the connection" includes the fact that no pre-configuration information is required to have been provided by the user. In other words, the connection is automatically established or created without pre-requested user input and without requiring any connection information from the user making the request. Thus, the operations of setting up the VCR are invisible to the user, and the user is not even required to know what a VCR is. Thus, unlike prior systems, the user is not required to have previously created a VCR or otherwise input connection information relating to the VCR.

When the access comprises a desired connection between the user application and a device, then the method automatically configures a connection between the fieldbus interface in the computer system and the device. The method may also configure a portion of the NI-FBUS software in the computer system for the connection. The user application is thus able to communicate through the NI-FBUS API and through the fieldbus interface to the device. The method preferably configures and establishes a virtual communication relationship (VCR) between the user application and the device in response to receiving the request, as described further below. Where the fieldbus system includes one or more bridges located between the fieldbus interface and the device, the method automatically configures the one or more bridges located between the fieldbus interface and the device to enable the communication.

When the access comprises a connection between first and second devices, then the method configures and establishes a virtual communication relationship (VCR) between the first and second devices. Where the fieldbus system includes one or more bridges located between the first and second devices, the method automatically configures the one or more bridges located between the first and second devices to enable the communication.

In step 226 the method automatically determines an index of the parameter using the parameter name and the tag name in response to the request. Where an object is being accessed that is not a parameter of a block, then the method automatically determines the index of the block. As discussed above with respect to configuring a connection, in the present disclosure, the method "automatically determining the index of the parameter" includes the fact that no pre-configuration information is required to have been provided by the user. In other words, name to index conversion is automatically performed without pre-requested user input and without further user input. Thus, the user is not required to have previously mapped the name to an index and is not even required to know the specific index of a parameter or object. Thus, unlike prior systems, the user is not required to have previously provided input of mappings between names and indices.

In step 228 the method performs the access request after automatically configuring the connection and after determining the index of the parameter. In the case of the user application connecting to a device, the step of performing the access request comprises the user application reading parameters (or objects) from the device or writing parameters (or objects) to the device. In the case of a connection between two devices the step of performing the access request comprises the first device accessing or communicating one or more parameter values to the second device.

As noted above, the steps of automatically configuring the connection and automatically determining the index are performed without requiring user pre-configuration of the index or the connection.

Figure 17:
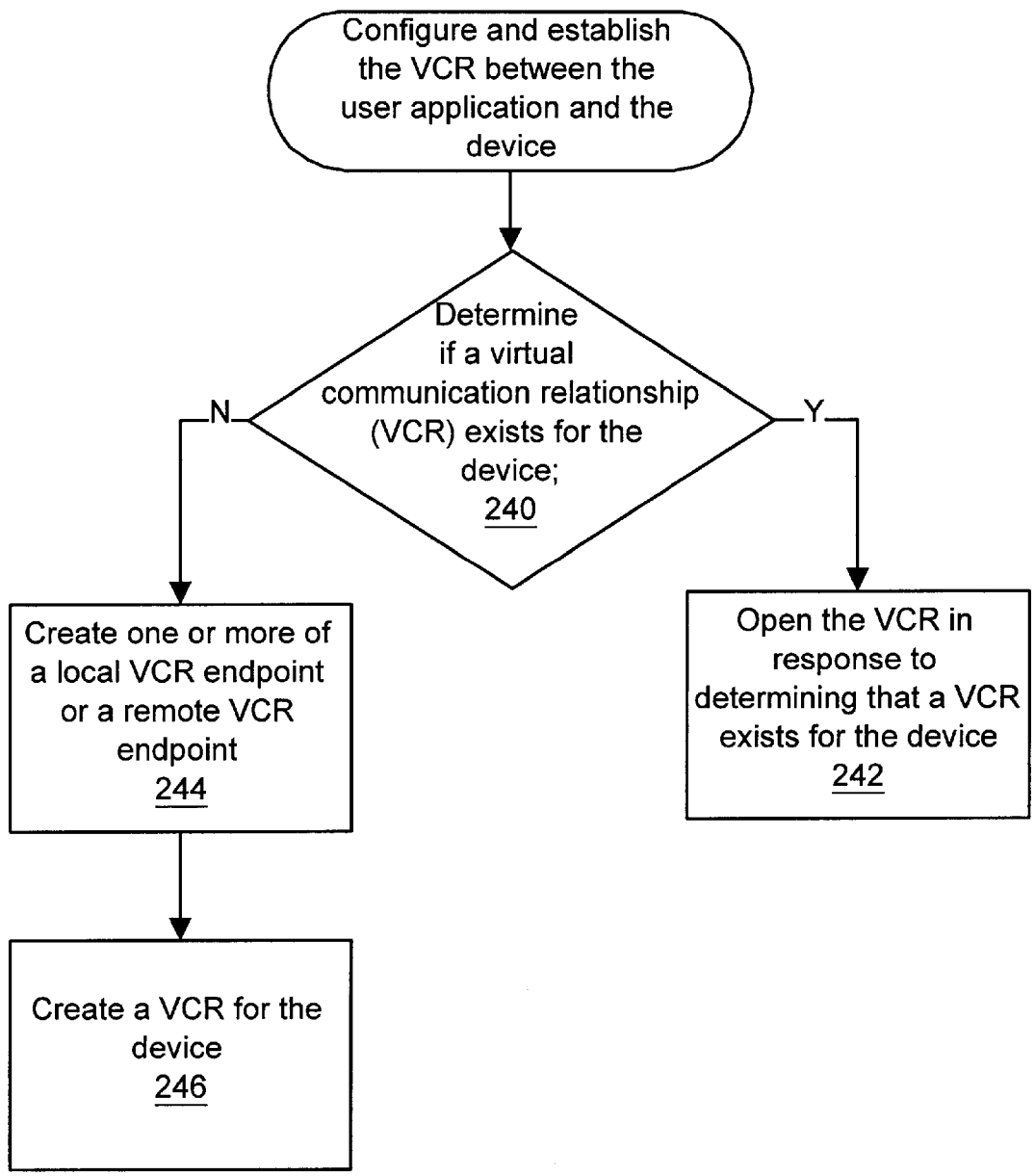
FIG. 17 illustrates a simplified flowchart of the connection management method establishing a VCR between the user application and a device.
Figure 18:
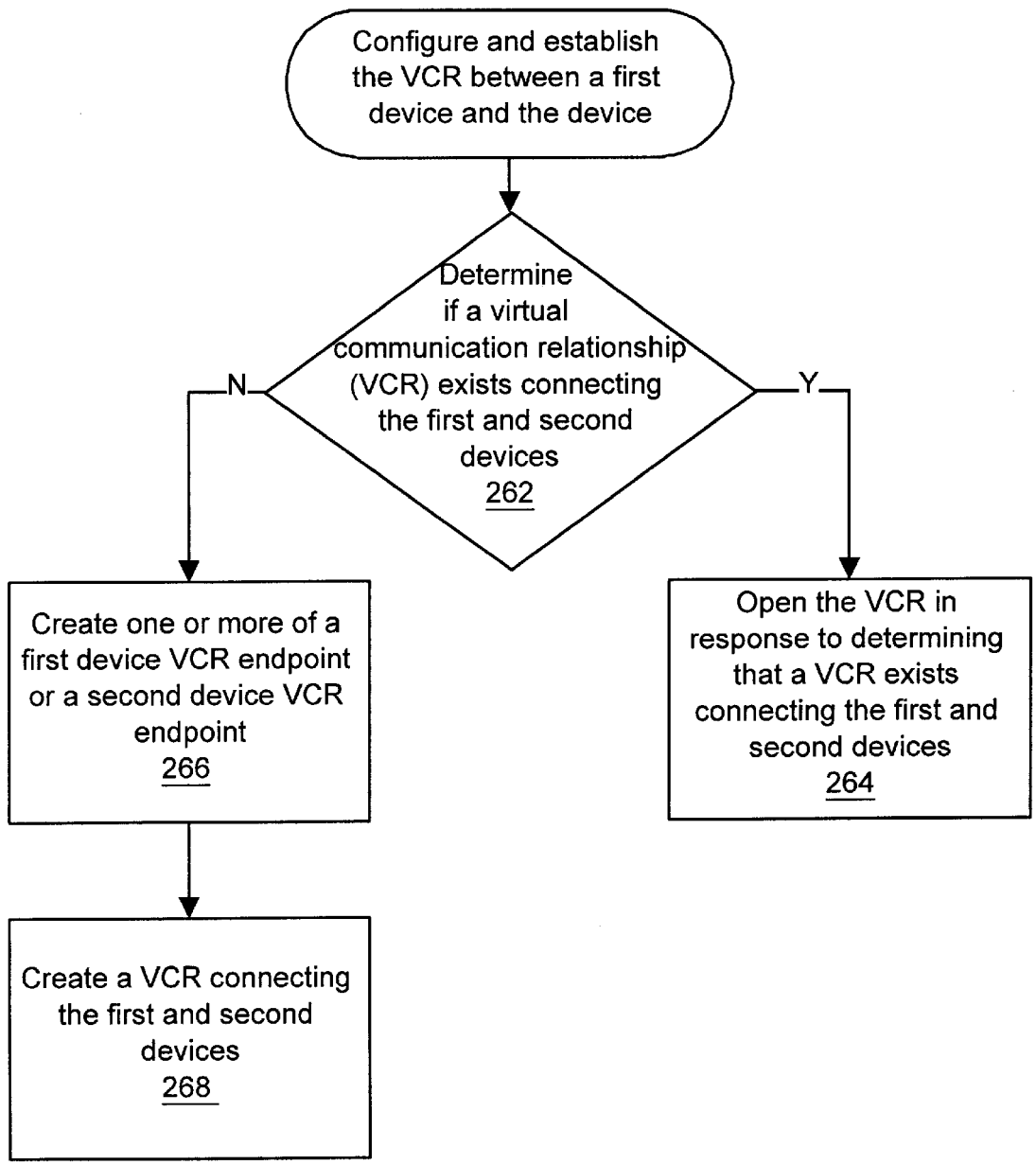
FIG. 18 illustrates a simplified flowchart of the connection management method establishing a VCR between first and second devices.

FIGS. 17 and 18—Configuring and Establishing the VCR

As noted above, when the access comprises a connection between the user application and a device, the method in step 224 comprises automatically configuring and establishing a virtual communication relationship (VCR) between the user application and the device. More particularly, when the access comprises a connection between the user application and a device, as shown in FIG. 17, step 224 comprises first determining if a virtual communication relationship (VCR) exists for the device in step 240. If a VCR does exist as determined in step 240, then in step 242 the method opens the VCR in response to determining that a VCR exists for the device. If a VCR does not exist as determined in step 240, then the method in step 244 creates one or more of a local VCR endpoint or a remote VCR endpoint in response to determining that a VCR does not exist for the device. In step 246 the method then creates a VCR for the device after creating one or more of a local VCR endpoint or a remote VCR endpoint in step 244.

Referring now to FIG. 18, when the access comprises a connection between first and second devices, the method in step 224 operates as follows. First, as shown in FIG. 18, step 224 comprises first determining if a virtual communication relationship (VCR) exists connecting the first and second devices in step 262. If a VCR does exist as determined in step 262, then in step 264 the method opens the VCR in response to determining that a VCR exists. If a VCR does not exist as determined in step 262, then the method in step 266 creates one or more of a first device VCR endpoint or a second device VCR endpoint in response to determining that a VCR does not exist. In step 268 the method then creates a VCR connecting the first and second devices after creating one or more of a first device VCR endpoint or a second device VCR endpoint in step 266.

Figure 19:
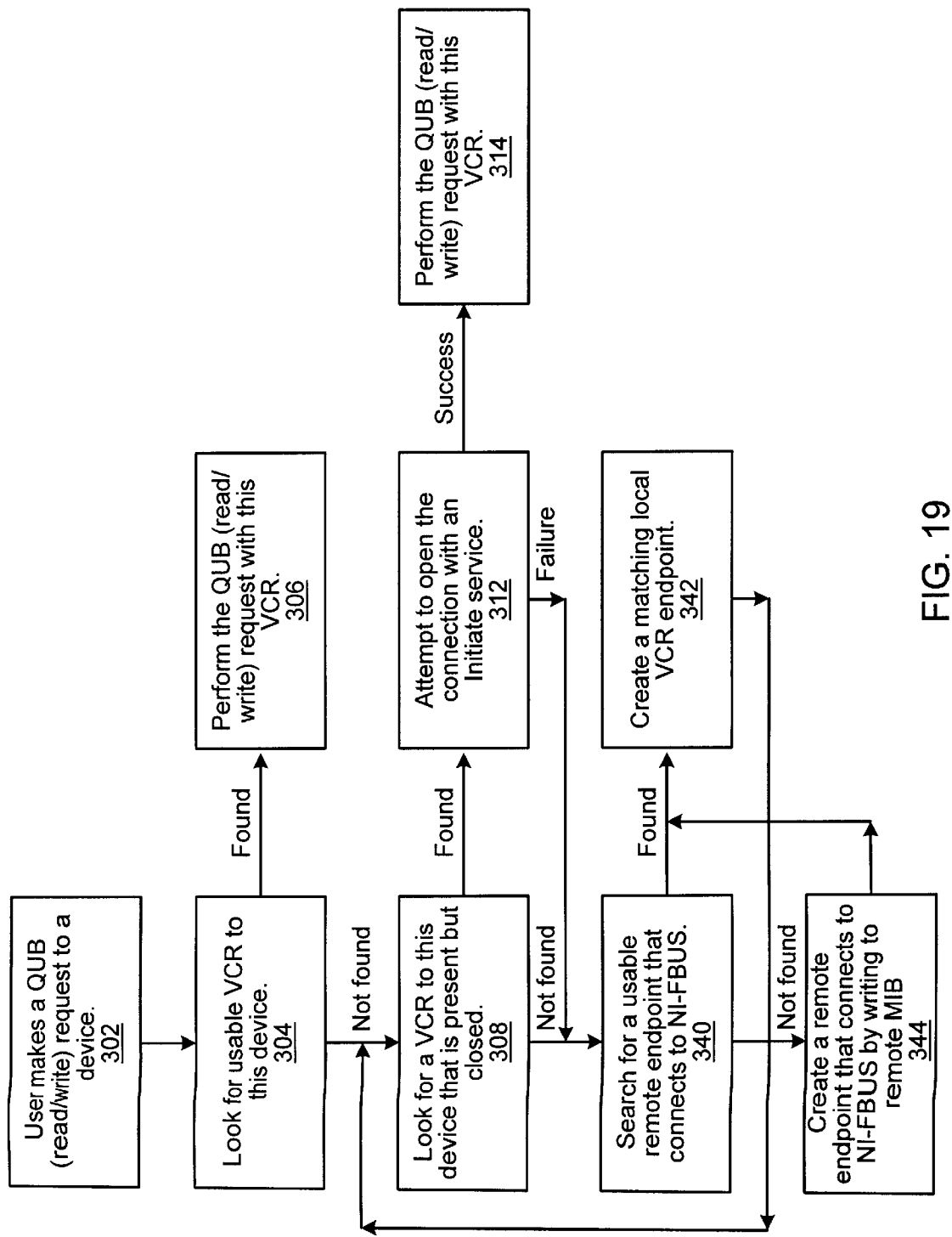
FIG. 19 is a flowchart diagram illustrating QUB connection management according to the preferred embodiment of the present invention.
Figure 20:
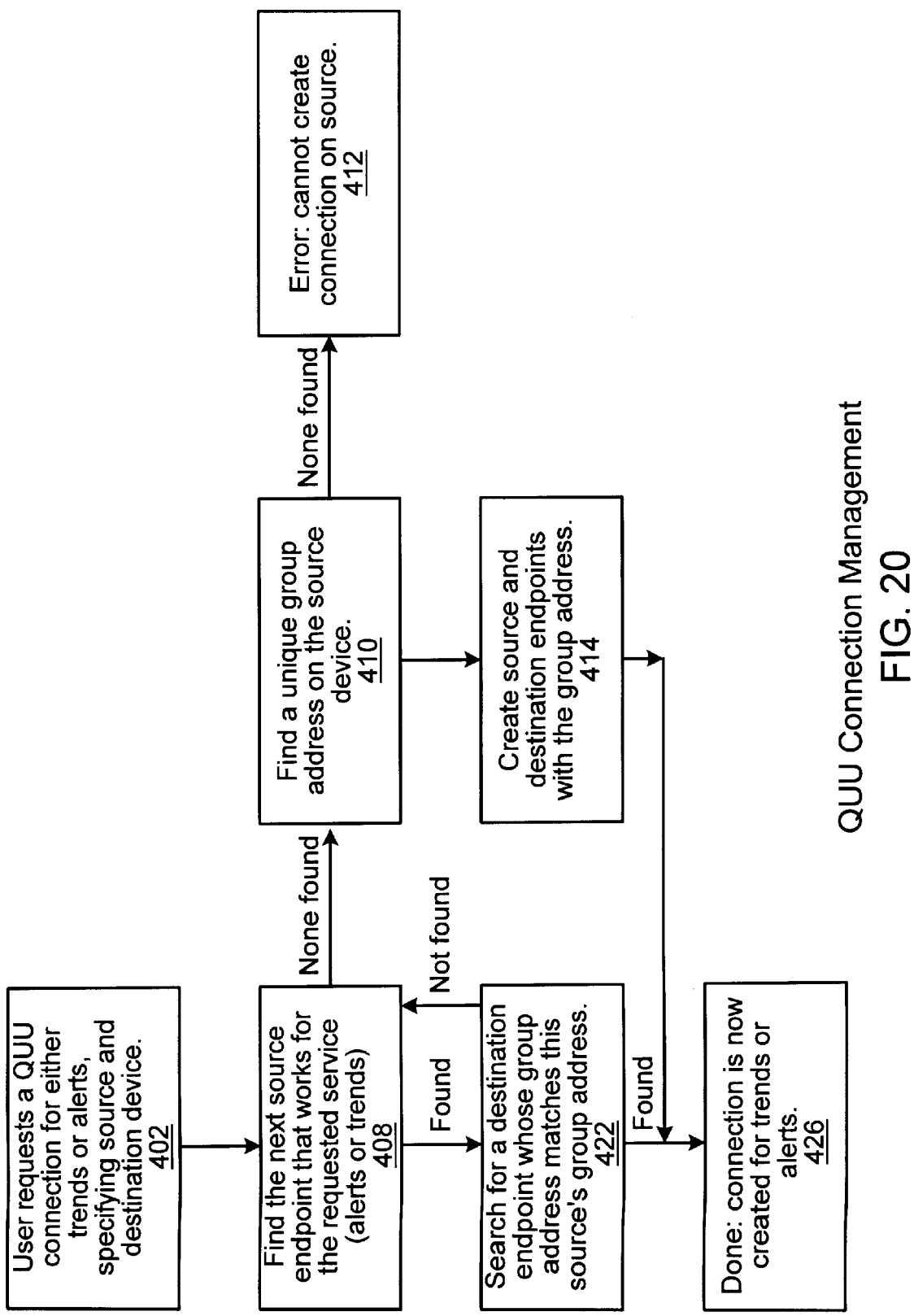
FIG. 20 is a flowchart diagram illustrating QUU connection management according to the preferred embodiment of the present invention.
Figure 21:
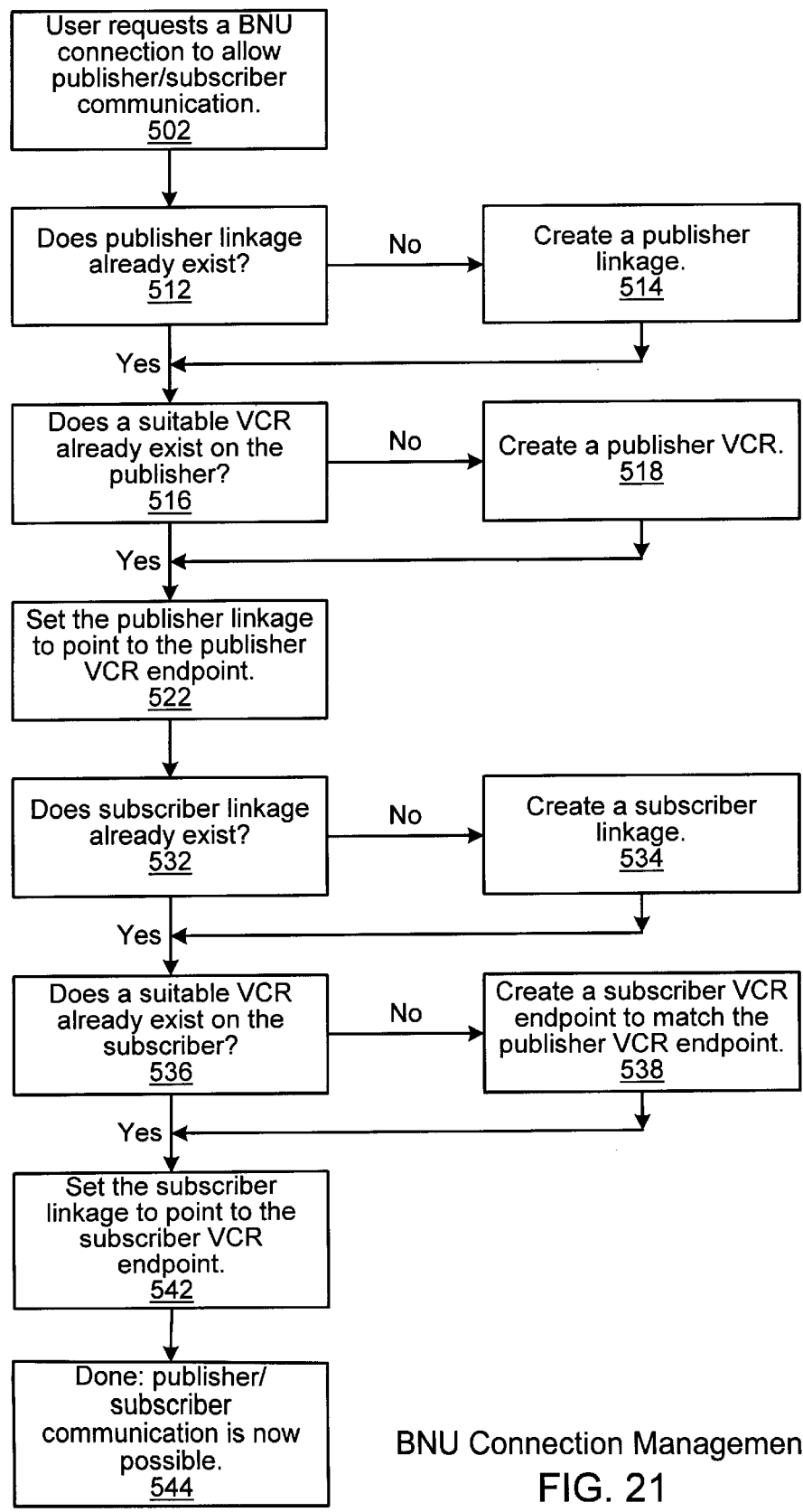
FIG. 21 is a flowchart diagram illustrating BNU connection management according to the preferred embodiment of the present invention.

Further detail of the operation of the flowcharts of FIGS. 17 and 18 are provided in the discussion related to FIGS. 19–21, provided below.

FIGS. 19–21: Connection Management

As discussed in the background section, in the Foundation Fieldbus protocol, the user application is generally required to perform connection management operations, also referred to as VCR (Virtual Communication Relationship) management operations. In prior art systems, the user and/or user application would have to input or maintain information on VCR, including initiating a VCR to open a connection and aborting or terminating a VCR to close a connection. The VCR management is either required by the user application or is pre-configured by the user in another application. This considerably complicates development or use of a user application.

The NI-FBUS API of the present invention includes a method of performing connection management or VCR management which frees the developer or user from having to manage connections on the Fieldbus network. According to the present invention, the user application is not required to request or set up a connection, is not required to monitor connections, and is not required to terminate connections. In other words, the present invention makes connection management invisible to the user and/or user applications. The NI-FBUS API of the present invention thus advantageously provides an intuitive system and method for establishing and removing connections in a fieldbus system. This provides a simplified system and method for developing applications in a fieldbus network. The NI-FBUS API of the present invention thus enables the process engineer or application program developer to more easily develop applications in a fieldbus network.

The system and method of the present invention includes three different methods for performing connection management. The method used depends on the type of VCR requested, i.e., whether QUB connection management, QUU connection management, or BNU connection management is desired.

FIG. 19—QUB Connection Management

Referring now to FIG. 19, a flowchart diagram illustrating operation of QUB Connection Management is shown. QUB Connection Management is used for client/server communications. According to the present invention, the user application is not required to specifically ask for a connection. Rather, the user application simply attempts to communicate with the device, and this attempt informs the NI-FBUS API that a client/server connection is needed to perform the particular read or write requested by the user. Thus the NI-FBUS API creates a VCR if necessary, as described in FIG. 19.

As shown, in step 302 the user application makes a QUB (read/write) request to a device, preferably using a device descriptor. This involves the user application making a simple read or write request to access a device or access a parameter of a device. In step 304 the method checks the memory for a usable, e.g., existing and open, VCR for this device. If an open VCR is found for this device in step 304, then in step 306 the method uses this VCR for the QUB request, and operation completes.

If an open VCR for this device is not found in step 304, then in step 308 the method checks the memory for an existing but closed VCR for this device. If an existing but closed VCR for this device is found in step 308, then in step 312 the method attempts to open the connection with an initiate service operation. If this attempt to open the connection is successful, then in step 314 the method uses this VCR for the QUB request, and operation completes. It is noted that steps 306 and 314 are similar to step 228 of FIG. 16.

If the attempt to open the connection fails in step 312, then operation proceeds to step 340. If an existing but closed VCR is determined to be not found for the device in step 308, then operation advances to step 340. In this case, an existing, open VCR was not found in step 304, and an existing, closed VCR was not found in step 308. Thus step 340 is entered when a VCR does not currently exist for the device.

In step 340 the method searches for a usable remote endpoint that connects to NI-FBUS. If a usable remote endpoint that connects to NI-FBUS is found in step 340, then in step 342 the method creates a matching local endpoint and a VCR in memory in step 342. After the method creates a matching local VCR endpoint in memory in step 342, then the method returns to step 308 to repeat the above operations. In other words, the method returns to re-check the memory for an existing but closed VCR for this device in step 308, and repeats the operations described above to again attempt to open the connection with the local VCR endpoint stored in step 342.

If a usable remote endpoint that connects to NI-FBUS is not found in step 340, then in step 344 the method creates a remote endpoint that connects to NI-FBUS by writing to the remote MIB (Management Information Base). A device's MIB stores list of endpoints and other information about the device. The method then advances to step 342 to create a matching local VCR endpoint in memory in step 342, after which the method returns to step 308 as described above.

Thus, if a VCR does not already exist, the method finds or creates either a local and/or remote endpoint, and then creates a matching VCR in memory.

FIG. 20—QUU Accesses

Referring now to FIG. 20, a flowchart diagram illustrating QUU Connection Management is shown. As shown, in step 402 a user application requests a QUU connection for either trends or alerts. This user application request specifies the source and destination device for the connection. In response to this request, in step 408 the method locates the next source endpoint that is operable for the requested service, i.e., for alert or trend service.

If a source endpoint is not found that operates for the requested service in step 408, then in step 410 the method attempts to find a unique group address on the source device. If the method is unable to locate a unique group address on the source device in step 410 then in step 412 the method returns an error indicating that the method cannot create a connection on the source.

If the method is able to find a unique group address on the source device in step 410, then in step 414 the method creates source and destination endpoints with this group address. The method then advances to step 426 wherein the method completes and a connection is now created for trend and/or alert service specified in the user application request.

If in step 408 the method finds the next source endpoint that is operable for the requested service, then in step 422 the method searches for a destination endpoint whose group address matches this source's group address. If a destination endpoint cannot be found in step 422, the method returns to step 408 to find a new source endpoint. It is noted that steps 408 and 422 may repeat more and more iterations until matching source and destination endpoints are found.

Once a destination endpoint is found in step 422 whose group address matches this source's endpoint group address, then in step 426 the method completes and the connection is now created for trends or alerts.

FIG. 21—BNU Connection Management

Referring now to FIG. 21, a flowchart diagram illustrating BNU Connection Management according to the preferred embodiment of the invention is shown. As shown, in step 502 a user application requests a BNU connection, i.e., a publisher/subscriber communication.

In step 512 the method determines if a publisher linkage already exists. If a publisher linkage is determined to not already exist in step 512, then the method creates a publisher linkage in step 514, and operation advances to step 516. If a publisher linkage is determined to already exist in step 512, then the method advances directly to step 516.

In step 516 the method determines if a suitable VCR already exists on the publisher. If a suitable VCR is determined to not already exist in step 516, then the method creates a publisher VCR in step 518, and operation advances to step 522. If a suitable VCR is determined to already exist on the publisher in step 516, then the method advances directly to step 522.

In step 522 the method sets the publisher linkage to point to the publisher VCR endpoint.

In step 532 the method determines if a subscriber linkage already exists. If a subscriber linkage is determined to not already exist in step 532, then the method creates a subscriber linkage in step 534, and operation advances to step 536. If a subscriber linkage is determined to already exist in step 532, then the method advances directly to step 536.

In step 536 the method determines if a suitable VCR already exists on the subscriber. If a suitable VCR is determined to not already exist in step 536, then the method creates a subscriber VCR endpoint in step 538 to match the publisher VCR endpoint created in step 518, and operation advances to step 542. If a suitable VCR is determined to already exist on the subscriber in step 536, then the method advances directly to step 542.

In step 542 the method sets the subscriber linkage to point to the subscriber VCR endpoint. In step 544 operation completes, and publisher/subscriber communication is now possible.

The NI-FBUS API of the present invention thus entirely removes concerns about the details of connections (and therefore VCR and linkages) from the user.

Therefore, for each of QUB, QUU and BNU accesses, similar steps are required. In each case, the method may be required to create one or more of a local or remote endpoint, create a VCR, and then initiate the connection.

The method for QUB accesses is different from QUU and BNU accesses because, in the method for QUB accesses, the user application does not specifically ask for a connection, but rather the user application simply makes a request and method then determines that a connection is required. In the methods for QUU and BNU accesses according to the preferred embodiment, the user application actually requests a connection. For example, in a BNU access, the user application makes a request to create a publisher/subscriber connection, and in response the method sets up the remote s endpoint and the local endpoint. The BNU and QUU accesses are also different in that they involve linkage objects as well as VCR objects. Thus, for BNU and QUU accesses, there are basically two different items required to be written to the remote endpoint and two possible items required to be written on the local side to create the connection, instead of just one for QUB accesses.

The following example illustrates operation of the connection management performed by the present invention. For a client/server request, such as writing a function block parameter, the user simply specifies the name of the block and the parameter desires to be accessed. The user could write the following "C" code:

nifWriteObject(blockDescriptor, "MODE_BLK.TARGET", &newMode,
sizeof(newMode)); In this case, entirely transparent to the user, the NI-FBUS method creates a client/server VCR (because Write is a client/server operation). This involves creating a local endpoint (on the client or host) and creating a remote endpoint (on the device that has the function block). The NI-FBUS method then "initiates" the connection, which is a Fieldbus operation used to place a virtual connection in an open or usable state. Finally, the NI-FBUS method performs the Write operation on the new connection, and returns the response to the user.

Figure 22:
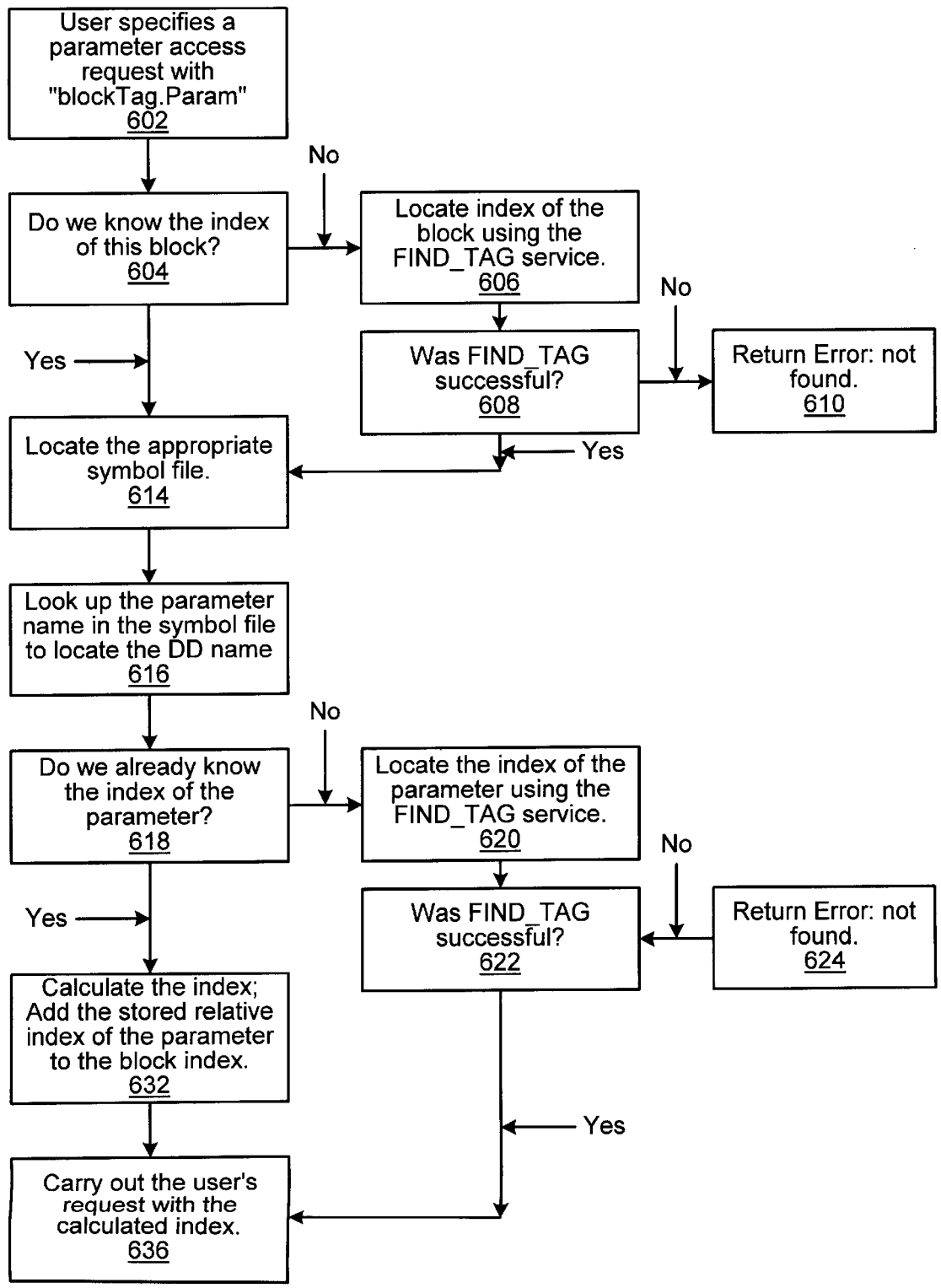
FIG. 22 is a flowchart diagram illustrating operation of block parameter access by name according to the present invention.
Figure 23:
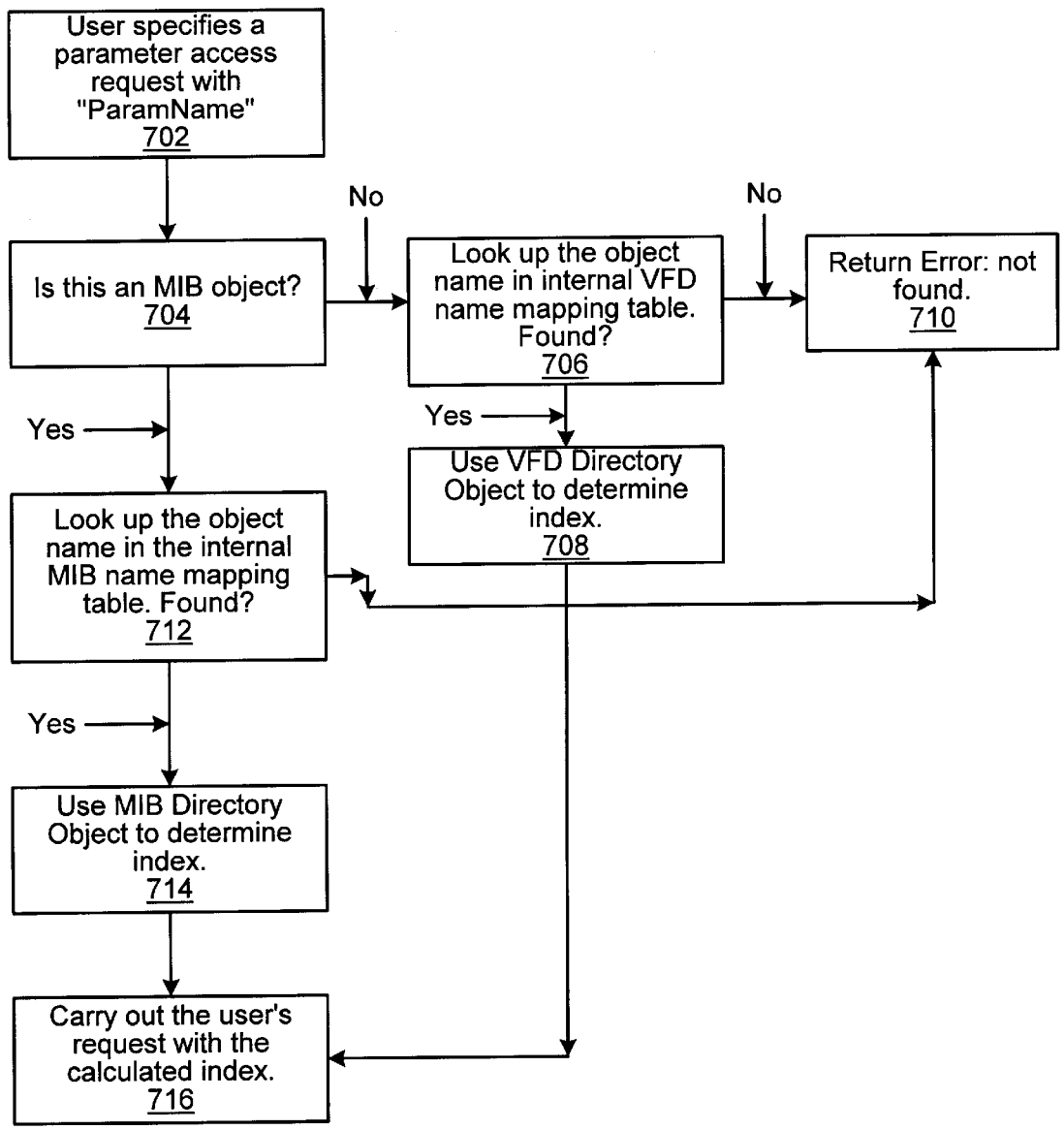
FIG. 23 is a flowchart diagram illustrating operation of object access by name according to the present invention.

FIGS. 22 and 23: Name to Index Conversion

As discussed in the background section, in the Foundation Fieldbus protocol, each parameter has an index or numeric identifier which uniquely identifies the parameter. Thus, in the Foundation Fieldbus protocol, in order to access parameters in Fieldbus devices, a host system must supply a numeric identifier called an index in the Fieldbus message. The numeric identifier, however, is not meaningful to a human. A parameter name, in the form of a text string, is also available for each parameter. However, this text string can not be sent in the Fieldbus message to directly access the parameter. Thus in prior art systems the user is required to use non-mnemonic numeric identifiers or indexes, instead of the parameter name, when accessing parameters.

The NI-FBUS API includes a method of performing name to index conversion which allows the developer to utilize parameter names when accessing parameters. The NI-FBUS API of the present invention thus advantageously provides an intuitive system and method for accessing parameters in a fieldbus system. This provides a simplified system and method for developing applications in a fieldbus network. The NI-FBUS API of the present invention thus allows the process engineer or application program developer an easy way of accessing, i.e., reading or writing, parameters in a fieldbus network.

The system and method of the present invention includes two different methods which offer users access to parameters by name. The method used depends on the type of object in the device the user desires to access. The first method is used for block parameter access, and the second method is used when the user desires to access (read or write) objects in a device that are not parameters of a block.

1. Block Parameter Access

A first method of the present invention is used when the user desires to access (read or write) a block parameter. Block parameters reside within function blocks contained within a Fieldbus device. It is noted that "function blocks" are one type of block that resides in a device. A device may also have a "resource block" and one or more "transducer blocks". However, treatment of name access for all these blocks is the same. The user specifies the name of the parameter to read or write, and specifies the block, either by block tag (a text string) or by block descriptor (which was returned to the user from a previous call to open the block).

Some sample API calls to read the process value (PV) from a block are as follows:

nifeadObject(blockDescriptor, "PV", readData, &readSize);

nifReadObject(sessionDescriptor, "PIDBlock.PV", readapt, &readSize);

In addition, some block parameters are records, i.e., some block parameters comprise one or more sub-elements that can be accessed individually. These sub-elements are also accessed by name. In the syntax of the preferred embodiment, the sub-elements of a parameter are separated from the parameter by a ".". The following examples read the actual mode of a block:

nifReadObject(blockDescriptor,"MODEhd —BLK.ACTUAL", readData, &readSize);

nifkeadObject(sessionDescriptor, "PIDBlock.MODE_ BLK.ACTUAL", readData, &readSize);

Thus the present invention enables the user to use the parameter name, instead of requiring the user to specify the parameter index.

FIG. 22: Block Parameter Access Flowchart Diagram

Referring now to FIG. 22, a flowchart diagram is shown illustrating operation of block parameter access by name according to the present invention. As shown, in step 602 the user or developer specifies a parameter access request using the syntax "blockTag.param". Thus, according to the present invention, the user can specify a parameter access, i.e., a parameter read or a parameter write, by simply using the syntax which references the block tag, i.e., the tag which identifies the block and the parameter of the block which is desired to be accessed. The user can thus reference the parameter by name and is not required to remember or use the numeric index. Thus, the user or developer can access parameters using the parameter name, which is much more mnemonic than the numeric identifier. It is noted that the parameter access request will generally be comprised in a user application executing in the fieldbus system.

In step 604 the method determines if the index of this block, and also the location of the block, is known. Thus, in step 604 the method examines the parameter name and determines if the index of this block is known in the system. If the index of this block is determined to be not known in step 604, then in step 606 the method locates the index and location of this block using a service referred to as FIND_TAG. Thus, if the index of the block is unknown, the method locates the index of the block using the FIND_TAG service. In step 608 the method determines if the FIND_TAG service was successful in locating the index of the block. If so, then operation proceeds to step 614. If the FIND_TAG service was not successful in locating the index of the block, then in step 610 an error is returned to the user indicating that the index or parameter was not found.

If the index of the block, and hence the location of the block, is determined to be known in step 604, then operation proceeds to step 614. In this instance, the method uses the stored index and location of the block. The stored index corresponds to the parameter name used by the user in step 602. In this instance, the index was stored in memory, perhaps from a prior use of the FIND_TAG service.

After either of steps 604 or 608, in step 614, the method locates the appropriate symbol file, i.e., the symbol file for the virtual field device (VFD) that contains this block. The symbol file comprises information such as a mapping from parameter name to Device Description (DD) name. In step 616 the method determines or looks up the parameter name in the symbol file in order to locate the device description name. Once the device description (DD) name has been located, then operation advances to step 618.

In step 618 the method determines if the device description name is already known, e.g., already resides in a memory. If the device description name is not already known, then in step 620 the method locates the index of the parameter using the FIND_TAG service. In step 622 the method determines if the FIND_TAG service was successful in locating the index of the parameter. If not, then the method returns an error indicating that the parameter was not found and operation completes. If the FIND_TAG service was successful in locating the index of the parameter in step 622 then operation proceeds to step 636.

If in step 618 the method determines that this DD name is already known, then in step 632 the method calculates the index. Here it is noted that the index of the parameter is stored in NI-FBUS as an offset relative to the start of the block. Thus in step 632 the method adds this stored index to the block index. This calculation performed in step 632 is not necessary in step 622, since the FIND_TAG service performs this calculation. After either of steps 632 or 622, the method has determined the index of the parameter, and operation advances to step 636.

In step 636 the index is inserted into the packet, and the user's request is performed with the calculated index. In other words, in step 636 the parameter access request is performed using the calculated index. Thus, in step 636, the packet is provided on the bus which includes the calculated index, and this packet operates to access the parameter indicated by the calculated index to read or write the respective parameter value.

2. Access to Other Named Objects

As mentioned above, the second method is used when the user, i.e., the user application, desires to access (read or write) objects in a device that are not parameters of a block. The Fieldbus Foundation specification describes several objects that are used in configuration of devices and networks that do not belong to any block. Examples are trend objects, MIB (Management Information Base) parameters, and linkage objects. These objects are also accessed over the Fieldbus by an index. The method of the present invention can be used to enable users to access these objects by name. The names of many of the objects (such as MIB parameters) are specified the Fieldbus specification, which was referenced above. Certain objects are specified in documentation related to the NI-FBUS available from National Instruments. The following example reads the second trend object from a device. The name "TREND" is from NI-FBUS documentation available from National Instruments.

nifReadObject(vfdDescriptor, "TREND.2", readData, &readSize);

The following example reads the macrocycle duration from the MIB of a device.

The name "MACROCYCLE_DURATION" comes from the Fieldbus specification:

nifReadObject(mibDescriptor, "MACROCYCLE_DURATION", readData, &readSize);

FIG. 23: Object Access Flowchart Diagram

Referring now to FIG. 23, a flowchart diagram is shown illustrating operation of a method for accessing objects by name which are not parameters of a block. In other words, FIG. 23 illustrates a method for accessing objects by name, wherein the objects accessed are not the parameters of a block.

As shown, in step 702 the user or developer specifies an object access request using the syntax "Object name". Thus, according to the present invention, the user can specify an object access, i.e., an object read or an object write, by simply using the syntax which references the object name which is desired to be accessed. The user can thus reference the object by name and is not required to remember or use the numeric index. Thus, the user or developer can access objects using the object name, which is much more mnemonic than the numeric identifier. It is noted that the object access request will generally be comprised in a user application executing in the fieldbus system.

In step 704 the method determines whether the object being accessed is an MIB object. If the object being accessed is not an MIB object in step 704, then the object is a VFD object, and the method obtains the index using the VFD name mapping table and VFD Directory Object in steps 706 and 708. If the object being accessed is an MIB object in step 704, then the method obtains the index using the MIB name mapping table and MIB Directory Object in steps 712 and 714

If the object being accessed is not an MIB object in step 704, then in step 706 the method looks up the object name in an internal VFD name mapping table. The VFD name mapping table is used to locate the portion of the VFD Directory Object for a specific VFD object. If the name is not found in the internal VFD name mapping table in step 706, then in step 710 the method returns an error to the user indicating that the name is not found.

If the name is present or found in the internal VFD name mapping table in step 706, then in step 708 the method uses the VFD directory object to determine the index. In step 708 the method receives a reference to a VFD Directory Object from the VFD name mapping table. In step 708 the method determines the category of the object, and then examines an index specified in the VFD Directory Object based on the determined category of the object. In some cases, the method is required to add an instance number to the index obtained from the directory object. After step 708, operation proceeds to step 716.

If the object being accessed is determined to be an MIB object in step 704, then in step 712 the method looks up the object name in the internal MIB name mapping table. The internal MIB name mapping table comprises a list of names and the corresponding portion of the MIB Directory Object. The MIB name mapping table is used to locate the portion of the MIB Directory Object for a specific MIB object. If the object name is not found in the internal MIB name mapping table in step 712, then operation advances to step 710 where an error indicating not found is returned.

If the object name is present in the internal MIB name mapping table, then in step 714 the method uses the MIB directory object to determine the index. In step 712 the method receives a reference to an MIB Directory Object from the MIB name mapping table. In step 714 the method determines the category of the object, and then examines an index specified in the MIB Directory Object based on the determined category of the object. After step 714, operation proceeds to step 716. Therefore, determining the index of the object using the MIB directory object comprises determining the category of the object, and then examining the index specified in the MIB Directory Object for objects of that category. In some cases, the method is required to add an instance number to the index obtained from the directory object.

After either of steps 708 and 714 where the method had determined the index of the parameter name or object, in step 716 the method performs the user's request with the calculated index. Thus, in step 716 the method inserts the index of the parameter name or object name desired to be accessed into the appropriate packet for transmission on the bus in order to access the desired parameter or object.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for enabling access to parameters in a fieldbus system, the fieldbus system comprising a computer system, wherein a fieldbus is coupled to the computer system, wherein one or more devices are coupled to the fieldbus, the method comprising:

receiving an access request from a user application to access a device, wherein said request includes a tag name and a parameter name, wherein the tag name corresponds to a block on a device, wherein the parameter name corresponds to a parameter in the block;

automatically configuring a connection in response to the request;

automatically determining an index of the parameter using the parameter name and the tag name in response to the request;

performing the access request after said automatically configuring the connection and after said determining the index of the parameter;

wherein said steps of automatically configuring the connection and automatically determining the index are performed without requiring user pre-configuration of said index or said connection.

2. The method of claim 1, wherein said access comprises a connection between the user application and the device;

wherein said automatically configuring the connection comprises automatically configuring and establishing a virtual communication relationship (VCR) between the user application and the device in response to receiving the request.

3. The method of claim 2, wherein the computer system executes a user application, wherein the computer system interfaces to the fieldbus through a fieldbus interface;

wherein said automatically configuring the connection between the user application and the device comprises automatically configuring the connection between the fieldbus interface and the device.

4. The method of claim 3, wherein the fieldbus system includes one or more bridges, wherein said one or more bridges are located between the fieldbus interface and the device;

wherein said automatically configuring the connection includes configuring the one or more bridges located between the fieldbus interface and the device.

5. The method of claim 2, wherein said performing the access request comprises the user application reading parameters from the device.

6. The method of claim 2, wherein said performing the access request comprises the user application writing parameters to the device.

7. The method of claim 1, wherein said access comprises a connection between two devices;

wherein said automatically configuring the connection comprises automatically configuring and establishing a virtual communication relationship (VCR) between the first and second devices.

8. The method of claim 7, wherein the fieldbus system includes one or more bridges, wherein said one or more bridges are located between the first and second devices;

wherein said automatically configuring the connection includes configuring the one or more bridges located between the first and second devices.

9. The method of claim 7, wherein said performing the access request comprises the first device communicating one or more parameter values to the second device.

10. The method of claim 1, wherein said access comprises configuring a device as a publisher;

wherein said automatically configuring the connection comprises automatically configuring the device as a publisher.

11. The method of claim 1, wherein said access request comprises a tag parameter construct, wherein the tag parameter construct comprises only the tag name and the parameter name.

12. The method of claim 1, wherein the connection comprises at least one of a QUB, QUU or BNU connection.

13. The method of claim 1, wherein said automatically configuring the connection comprises configuring and establishing a virtual communication relationship (VCR) between the user application and the device in response to receiving the request, wherein said configuring and establishing the VCR comprises:

determining if a virtual communication relationship (VCR) exists for the device;

opening the VCR in response to determining that a VCR exists for the device;

creating one or more of a local VCR endpoint or a remote VCR endpoint in response to determining that a VCR does not exist for the device;

creating a VCR for the device after said creating one or more of a local VCR endpoint or a remote VCR endpoint.

14. The method of claim 13, wherein said automatically configuring the connection further comprises:

determining if a linkage exists for a local endpoint of the user application and a remote endpoint of the device; and creating one or more of a linkage for the local endpoint of the user application or a linkage for the remote endpoint of the device in response to determining that a linkage does not exist for one or more of the local endpoint of the user application and the remote endpoint of the device.

15. The method of claim 1, wherein said automatically configuring the connection comprises configuring and establishing a virtual communication relationship (VCR) between a first device and a second device in response to receiving the request, wherein said configuring and establishing the VCR comprises:

determining if a virtual communication relationship (VCR) exists connecting the first and second devices;

opening the VCR in response to determining that a VCR exists connecting the first and second devices;

creating one or more of a first device VCR endpoint or a second device VCR endpoint in response to determining that a VCR does not exist connecting the first and second devices;

creating a VCR for the first and second devices after said creating one or more of a first device VCR endpoint or a second device VCR endpoint.

16. The method of claim 15, wherein said automatically configuring the connection further comprises:

determining if a linkage exists for a local endpoint of the first device and a remote endpoint of the second device; and creating one or more of a linkage for the local endpoint of the first device or a linkage for the remote endpoint of the second device in response to determining that a linkage does not exist for one or more of the local endpoint of the first device and the remote endpoint of the second device.

17. The method of claim 1, wherein said automatically determining the index of the parameter comprises:

determining the device description name of the parameter after receiving said parameter access request; and obtaining an index of the parameter from the device description name.

18. The method of claim 17, wherein the block is comprised in a virtual field device, the method further comprising:

locating a symbol file for the virtual field device that comprises the requested block;

wherein said determining the device description name comprises:

determining the parameter name in the symbol file to locate the device description name.

19. The method of claim 1, wherein said automatically determining the index of the parameter comprises:

receiving an object access request, wherein said object access request includes an object name;

determining if the object access request is requesting a Management Information Base (MIB) object;

determining the object name in the internal MIB name mapping table if the object access request is requesting an MIB object; and determining the index of the object using the object name.

20. The method of claim 19, wherein said determining the index of the object using the object name comprises:

receiving a reference to an MIB Directory Object from the MIB name mapping table;

determining the category of the object; and examining an index specified in the MIB Directory Object based on the determined category of the object.

21. The method of claim 1, wherein said automatically determining the index of the parameter comprises analyzing a symbol file, wherein said symbol file includes a mapping from the parameter name to a device description name of the parameter.

22. A method for enabling access to parameters in a fieldbus system, the fieldbus system comprising a computer system, a fieldbus coupled to the computer system, and one or more devices coupled to the fieldbus, wherein the computer system executes a user application, wherein the computer system interfaces to the fieldbus through a fieldbus interface, the method comprising:

receiving an access request from a user application to access a device, wherein said request includes a tag name and a parameter name, wherein the tag name corresponds to a block on a device, wherein the parameter name corresponds to a parameter in the block;

automatically configuring a connection in response to the request, wherein said automatically configuring the connection includes automatically establishing a virtual communication relationship (VCR) between the user application and the device in response to receiving the request;

automatically determining an index of the parameter using the parameter name and the tag name in response to the request;

performing the access request after said automatically configuring the connection and after said determining the index of the parameter;

wherein said steps of automatically configuring the connection and automatically determining the index are performed without user pre-configuration of said index or said connection.

23. A method for performing connection management in a fieldbus system, the fieldbus system comprising a computer system, a fieldbus coupled to the computer system, and one or more devices coupled to the fieldbus, the method comprising:

receiving a request from a user application to access a device, wherein the request indicates a client/server relationship;

automatically configuring a connection in response to the request, wherein said automatically configuring the connection comprises automatically establishing a virtual communication relationship (VCR) between the user application and the device in response to receiving the request, wherein said automatically establishing the VCR comprises:

determining if a virtual communication relationship (VCR) exists for the device;

opening the VCR in response to determining that a VCR exists for the device;

creating one or more of a local VCR endpoint or a remote VCR endpoint in response to determining that a VCR does not exist for the device;

creating a VCR for the device after said creating one or more of a local VCR endpoint or a remote VCR endpoint.

24. The method of claim 23, wherein said automatically configuring the connection further comprises:

determining if a linkage exists for a local endpoint of the user application and a remote endpoint of the device; and creating one or more of a linkage for the local endpoint of the user application or a linkage for the remote endpoint of the device in response to determining that a linkage does not exist for one or more of the local endpoint of the user application and the remote endpoint of the device.

25. A method for performing connection management in a fieldbus system, the fieldbus system comprising a computer system, a fieldbus coupled to the computer system, and first and second devices coupled to the fieldbus, the method comprising:

receiving a request from a user application to access a device, wherein the request indicates a client/server relationship;

automatically configuring a connection in response to the request, wherein said automatically configuring the connection comprises automatically establishing a virtual communication relationship (VCR) between the first device and the second device in response to receiving the request, wherein said automatically establishing the VCR comprises:

determining if a virtual communication relationship (VCR) exists connecting the first and second devices;

opening the VCR in response to determining that a VCR exists connecting the first and second devices;

creating one or more of a first device VCR endpoint or a second device VCR endpoint in response to determining that a VCR does not exist connecting the first and second devices;

creating a VCR for the first and second devices after said creating one or more of a first device VCR endpoint or a second device VCR endpoint.

26. The method of claim 25, wherein said automatically configuring the connection further comprises:

determining if a linkage exists for a local endpoint of the first device and a remote endpoint of the second device; and creating one or more of a linkage for the local endpoint of the first device or a linkage for the remote endpoint of the second device in response to determining that a linkage does not exist for one or more of the local endpoint of the first device and the remote endpoint of the second device.

27. A method for performing connection management in a fieldbus system, the fieldbus system comprising a computer system, a fieldbus coupled to the computer system, and one or more devices coupled to the fieldbus, the method comprising:

receiving a request from a user application to access a device, wherein the request indicates a client/server relationship;

automatically establishing a virtual communication relationship (VCR) between the user application and the device in response to receiving the request, wherein said automatically establishing the VCR comprises:

determining if an existing closed virtual communication relationship (VCR) exists for the device in response to receiving the request;

opening the VCR in response to determining that an existing closed VCR exists for the device;

searching for a usable remote endpoint that connects to the user application;

creating a matching local VCR endpoint in response to locating a usable remote endpoint that connects to the user application.

28. The method of claim 27, wherein said automatically establishing the VCR further comprises:

creating a remote endpoint that connects to the user application in response to said searching not being able to locate a usable remote endpoint that connects to the user application, wherein said creating the remote endpoint includes writing data to a management information base (MIB) of the device;

wherein said creating the matching local VCR endpoint is also performed after said creating the remote endpoint that connects to the user application.

29. A method for performing connection management in a fieldbus system, the fieldbus system comprising a computer system, a fieldbus coupled to the computer system, and one or more devices coupled to the fieldbus, the method comprising:

receiving a request from a user application for a service, wherein the request indicates a QUU relationship, wherein the request specifies a source and destination device;

locating a source endpoint that operates for the requested service, wherein the source endpoint includes a group address; and locating a destination endpoint that has a group address which matches the group address of the source endpoint;

wherein said locating the source endpoint and locating the destination endpoint operates to create the connection.

30. The method of claim 29, wherein said locating a source endpoint does not locate a source endpoint that operates for the requested service, the method further comprising:

locating a unique group address on the source device; and creating source and destination endpoints which includes said unique group address.

31. A method for performing connection management in a fieldbus system, the fieldbus system comprising a computer system, a fieldbus coupled to the computer system, and one or more devices coupled to the fieldbus, the method comprising:

receiving a request from a user application to access a device, wherein the request indicates a publisher/subscriber communication;

automatically establishing a virtual communication relationship (VCR) between one or more publishers and one or more subscribers in response to receiving the request, wherein said automatically establishing the VCR comprises:

searching for a publisher linkage;

searching for a publisher VCR endpoint that is already configured on the publisher;

setting the publisher linkage to point to the publisher VCR endpoint;

searching for a subscriber linkage;

searching for a subscriber VCR endpoint that matches the publisher endpoint; and setting the subscriber linkage to point to the subscriber VCR endpoint.

32. The method of claim 31, the method further comprising:

creating a publisher linkage for the published parameter if said searching for a publisher linkage does not find a publisher linkage;

creating a publisher VCR endpoint if said searching for a publisher VCR does not find a publisher VCR endpoint;

creating a subscriber linkage for the published parameter if said searching for a subscriber linkage does not find a subscriber linkage; and creating a subscriber VCR endpoint if said searching for a subscriber VCR does not find a subscriber VCR endpoint.

33. The method of claim 31, the method further comprising:

performing publisher/subscriber communication in response to said automatically establishing the VCR between the one or more publishers and the one or more subscribers.

34. A method for accessing parameters in a block by name in a fieldbus system, the fieldbus system comprising a computer system, a fieldbus bus coupled to the computer system, and one or more devices coupled to the fieldbus bus, wherein one or more of the devices include one or more blocks, the method comprising:

receiving a parameter access request, wherein the parameter access request specifies a block tag which specifies a block, wherein the parameter access request also specifies a parameter name of the parameter being requested;

determining the device description name of the parameter after receiving said parameter access request;

obtaining an index of the parameter from the device description name; and performing the parameter access using the parameter index.

35. The method of claim 34, wherein the block is comprised in a virtual field is device, the method further comprising:

locating a symbol file for the virtual field device that comprises the requested block;

wherein said determining the device description name comprises:

determining the parameter name in the symbol file to locate the device description name.

36. The method of claim 35, further comprising:

determining a location of the block requested in the parameter access prior to said locating said symbol file, wherein said locating the symbol file includes using the determined location of the block to locate the symbol file.

37. The method of claim 36, wherein said determining the index of the block comprises:

determining if the index of the block is stored;

locating the index of the block using a find service if the index of the block is not stored.

38. The method of claim 34, wherein said obtaining the index of the parameter includes using a find tag service.

39. The method of claim 34, further comprising:

determining an index of the block requested in the parameter access;

wherein said performing the parameter access using the parameter index comprises:

adding the parameter index to the block index to obtain an actual index;

inserting said actual index into a packet; and providing said packet including said actual index on the fieldbus bus, wherein said packet is operable to perform said parameter access request on the fieldbus bus.

40. A method for accessing objects in a device by name in a fieldbus system, the fieldbus system comprising a computer system, a fieldbus bus coupled to the computer system, and one or more devices coupled to the fieldbus bus, wherein one or more of the devices include one or more objects, the method comprising:

receiving an object access request, wherein said object access request includes an object name;

determining if the object access request is requesting a Management Information Base (MIB) object;

determining the object name in the internal MIB name mapping table if the object access request is requesting an MIB object;

determining the index of the object using the object name;

performing the object access using the determined index.

41. The method of claim 40, wherein said determining the index of the object using the object name comprises:

receiving a reference to an MIB Directory Object from the MIB name mapping table;

determining the category of the object; and examining an index specified in the MIB Directory Object based on the determined category of the object.

42. The method of claim 40, further comprising:

determining the object name in an internal virtual field device (VFD) name mapping table if the object being requested is not an MIB object;

determining the index of the object using the object name.

43. The method of claim 42, wherein said determining the index of the object using the object name comprises:

receiving a reference to a VFD Directory Object from the VFD name mapping table;

determining the category of the object; and examining an index specified in the VFD Directory Object based on the determined category of the object.

* * * * *

UNITED STATES PATENT AND TRADEMARK OFFICE
CERTIFICATE OF CORRECTION

PATENT NO. : 5,978,850

DATED : November 2, 1999

INVENTOR(S) : Ramachandran et al.

It is certified that error appears in the above-identified patent and that said Letters Patent is hereby corrected as shown below:

Claim 35, col. 34, line 21, please delete "is" between the words field and device.

Signed and Sealed this

Ninth Day of May, 2000

Attest:

Attesting Officer

Q. TODD DICKINSON

Director of Patents and Trademarks